(12) United States Patent
Heo et al.

(10) Patent No.: US 12,518,837 B2
(45) Date of Patent: Jan. 6, 2026

(54) MEMORY DEVICE INCLUDING PRECHARGE VOLTAGE CONTROL AND METHOD OF OPERATING THE MEMORY DEVICE

(71) Applicant: SK hynix Inc., Icheon-si (KR)

(72) Inventors: Hye Eun Heo, Icheon-si (KR); Hyun Seung Yoo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 260 days.

(21) Appl. No.: 18/323,306

(22) Filed: May 24, 2023

(65) Prior Publication Data

US 2024/0161834 A1 May 16, 2024

(30) Foreign Application Priority Data

Nov. 15, 2022 (KR) .................. 10-2022-0152859

(51) Int. Cl.
*G11C 16/04* (2006.01)
*G11C 16/30* (2006.01)

(52) U.S. Cl.
CPC .......... *G11C 16/30* (2013.01); *G11C 16/0483* (2013.01)

(58) Field of Classification Search
CPC ..... G11C 16/30; G11C 16/0483; G11C 16/08; G11C 16/10; G11C 16/24; G11C 16/12; G11C 16/34
USPC .................................................. 365/185.25
See application file for complete search history.

(56) References Cited

U.S. PATENT DOCUMENTS

| | | | |
|---|---|---|---|
| 9,595,333 B2 * | 3/2017 | Sim ................... | G11C 16/10 |
| 10,008,271 B1 * | 6/2018 | Diep .................. | G11C 16/26 |
| 10,957,394 B1 * | 3/2021 | Chen .................. | G11C 16/10 |
| 2013/0242675 A1 * | 9/2013 | Kwak .................. | G11C 8/08 |
| | | | 365/189.09 |

FOREIGN PATENT DOCUMENTS

| | | |
|---|---|---|
| KR | 1020120078228 A | 7/2012 |
| KR | 1020150025495 A | 3/2015 |
| KR | 1020220015245 A | 2/2022 |

* cited by examiner

*Primary Examiner* — Tha-O H Bui
(74) *Attorney, Agent, or Firm* — WILLIAM PARK AND ASSOCIATES LTD.

(57) ABSTRACT

The present technology includes a memory device and a method of operating the same. The memory device includes a string including a first select transistor, memory cells, and a second select transistor connected between a source line and a bit line, and a voltage generator configured to supply a precharge voltage to the source line and selectively apply a turn on voltage or a negative voltage to a first select line connected to a gate of the first select transistor. The voltage generator is configured to apply the precharge voltage to the source line, apply the turn on voltage to the first select line during a first time in which a channel layer of the string is precharged, and apply the negative voltage to the first select line during a second time in which the channel layer of the string is precharged, while precharging the channel layer of the string.

31 Claims, 20 Drawing Sheets

MEMORY DEVICE INCLUDING PRECHARGE VOLTAGE CONTROL AND METHOD OF OPERATING THE MEMORY DEVICE

CROSS-REFERENCE TO RELATED APPLICATION

The present application claims priority under 35 U.S.C. § 119(a) to Korean patent application number 10-2022-0152859 filed on Nov. 15, 2022, in the Korean Intellectual Property Office, the entire disclosure of which is incorporated by reference herein.

BACKGROUND

1. Technical Field

Various embodiments of the present disclosure generally relate to a memory device and a method of operating the memory device, and more particularly, to a memory device and a method of operating the memory device related to performance of a program operation.

2. Related Art

A memory device may include a memory cell array in which data is stored, a peripheral circuit configured to perform a program, read, or erase operation, and a control circuit configured to control the peripheral circuit.

The memory cell array may include a plurality of memory blocks, and each of the plurality of memory blocks may include a plurality of memory cells. A memory device having a three-dimensional structure may include memory cells stacked on a substrate. For example, in the memory device having the three-dimensional structure, the memory blocks may include a plurality of strings extending in a vertical direction from the substrate, and each of the plurality of strings may include a plurality of memory cells.

During a program operation of a selected memory block among the plurality of memory blocks, memory cells included in selected strings among the plurality of strings included in the selected memory block may be programmed. While the selected memory cells are programmed, program on memory cells included in unselected strings is required to be inhibited. The unselected strings may be strings including memory cells to be maintained in an erase state or memory cells of which program is completed. During the program operation, in order to prevent or mitigate a threshold voltage of unselected memory cells included in the unselected strings from increasing, channel layers of the unselected strings may be precharged to have a potential of a positive voltage. For example, in order to precharge the unselected strings, a precharge voltage may be applied to a source line connected to the strings, and in order to transfer the precharge voltage applied to the source lines to the channel layers of the strings, a turn on voltage may be applied to source select lines. Here, the source select line may be gate lines of source select transistors configured to transfer or block the voltage applied to the source line to the channel layers of the strings.

SUMMARY

According to an embodiment of the present disclosure, a memory device may include a string including a first select transistor, memory cells, and a second select transistor connected between a source line and a bit line, and a voltage generator configured to supply a precharge voltage to the source line and selectively apply a turn on voltage or a negative voltage to a first select line connected to a gate of the first select transistor. The voltage generator may be configured to apply the precharge voltage to the source line, apply the turn on voltage to the first select line during a first time in which a channel layer of the string is precharged, and apply the negative voltage to the first select line during a second time in which the channel layer of the string is precharged, while precharging the channel layer of the string.

According to an embodiment of the present disclosure, a method of operating a memory device may include applying a turn on voltage to a first select line connected to a gate of a first select transistor during a first time, in order to precharge a string including the first select transistor, a second select transistor, and memory cells connected between the first and second select transistors, applying a negative voltage to the first select line during a second time in order to precharge the string, and applying a program voltage to a selected word line among word lines connected to gates of the memory cells when the string is precharged.

According to an embodiment of the present disclosure, a method of operating a memory device may include comparing the number of program loops with a reference number, precharging a string by applying a turn on voltage to a first select line connected to a gate of a first select transistor among the first select transistor, a second select transistor, and memory cells connected between the first and second select transistors included in the string, when the number of program loops is less than the reference number, and precharging the string by applying the turn on voltage to the first select line during a first time and applying a negative voltage during a second time, when the number of program loops is equal to or greater than the reference number.

According to an embodiment of the present disclosure, a method of operating a memory device may include comparing a selected page number with a reference page number, precharging a string by applying a turn on voltage to a first select line connected to a gate of a first select transistor among the first select transistor, a second select transistor, and memory cells connected between the first and second select transistors included in the string, when the selected page number is less than the reference page number, and precharging the string by applying the turn on voltage to the first select line during a first time and applying a negative voltage during a second time, when the selected page number is equal to or greater than the reference page number.

DETAILED DESCRIPTION

Specific structural or functional descriptions disclosed below are exemplified to describe an embodiment according to the concept of the present disclosure. The embodiment according to the concept of the present disclosure is not construed as being limited to the embodiments described below, and may be variously modified and replaced with other equivalent embodiments.

Hereinafter, terms such as first and second may be used to describe various components, but the components are not limited by the terms. The terms are used for the purpose of distinguishing one component from another component.

An embodiment of the present disclosure provides a memory device and a method of operating the memory device capable of improving reliability of a program operation.

An embodiment of the present technology may improve reliability of a program operation performed in a memory device.

Figure 1:
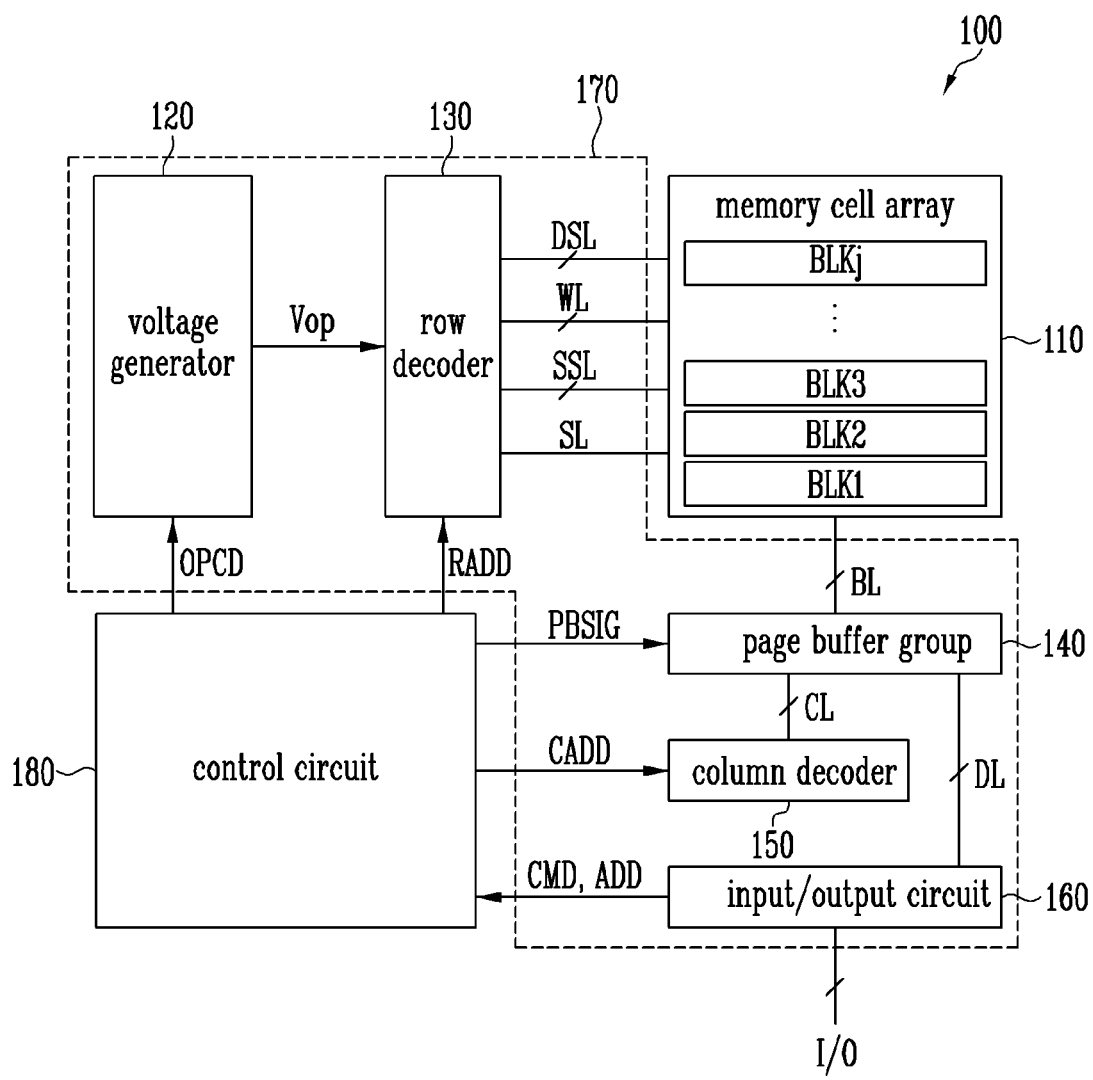
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include first to j-th memory blocks BLK1 to BLKj. Each of the first to j-th memory blocks BLK1 to BLKj may include memory cells capable of storing data. The memory blocks may be formed in a three-dimensional structure. Drain select lines DSL, word lines WL, source select lines SSL, and a source line SL may be connected to each of the first to j-th memory blocks BLK1 to BLKj, and a bit line BL may be commonly connected to the first to j-th memory blocks BLK1 to BLKj.

The first to j-th memory blocks BLK1 to BLKj may be formed in a two-dimensional structure or a three-dimensional structure. The memory blocks having the two-dimensional structure may include memory cells arranged parallel to a substrate. The memory blocks having a three-dimensional structure may include memory cells stacked on a substrate in a vertical direction. In the present embodiment, the memory blocks formed in the three-dimensional structure are described for convenience of description, but the present embodiment may also be applied to the memory blocks having the two-dimensional structure.

The memory cells may store 1 bit or 2 bits or more of data according to a program method. For example, a method in which 1 bit of data is stored in one memory cell is referred to as a single level cell method, and a method in which 2 bits of data is stored in one memory cell is referred to as a multi-level cell method. A method in which 3 bits of data is stored in one memory cell is referred to as a triple level cell method, and a method in which 4 bits of data is stored in one memory cell is referred to as a quad level cell method. In addition to this, five bits or more of data may be stored in one memory cell.

The peripheral circuit 170 may be configured to perform a program operation of storing data in the memory cell array 110, a read operation of outputting the data stored in the memory cell array 110, and an erase operation of erasing the data stored in the memory cell array 110. For example, the peripheral circuit 170 may include a voltage generator 120, a row decoder 130, a page buffer group 140, a column decoder 150, and an input/output circuit 160.

The voltage generator 120 may generate various operation voltages Vop used for the program operation, the read operation, or the erase operation in response to an operation code OPCD. For example, the voltage generator 120 may be configured to generate a program voltage, a pass voltage, a turn on voltage, a turn off voltage, a negative voltage, a precharge voltage, a verify voltage, a read voltage, or an erase voltage in response to the operation code OPCD. The voltages generated by the voltage generator 120 may be applied to the drain select lines DSL, the word lines WL, the source select lines SSL, and the source line SL of memory block selected through the row decoder 130.

The program voltage may be a voltage applied to a selected word line among the word lines WL during the program operation, and may be used to increase a threshold voltage of memory cells connected to the selected word line. The pass voltage may be a voltage applied to unselected word lines among the word lines WL during the program or read operation, and may be used to turn on memory cells connected to the unselected word lines. During the program or read operation, the pass voltage may be temporarily applied to the selected word line. The turn on voltage may be a voltage applied to the drain select lines DSL or the source select lines SSL, and may be used to turn on drain select transistors or source select transistors. The turn off voltage may be a voltage applied to the drain select lines DSL or the source select lines SSL, and may be used to turn off the drain select transistors or the source select transistors. For example, the turn off voltage may be set to 0V.

The negative voltage may be a voltage lower than 0V, and may be applied to the source select lines SSL, the drain select lines DSL, or the word lines WL in the present embodiment. For example, in a partial period a step of precharging channel layers of unselected strings with a precharge voltage higher than 0V, the negative voltage may be applied to the source select lines SSL, the drain select lines DSL, or the word lines WL. Alternatively, in the step of precharging the channel layers, the negative voltage or the turn on voltage may be applied to the source select lines SSL or the drain select lines DSL. For example, the turn on voltage may be applied to the source select lines SSL or the drain select lines DSL in a partial period of the step of precharging the channel layers, and the negative voltage may be applied to the source select lines SSL or the drain select lines DSL in a remaining period.

The precharge voltage is a voltage higher than 0V, and is a voltage for precharging the channel layers of the unselected strings with a positive voltage during the program operation. For example, the precharge voltage may be supplied to the source line SL.

The verify voltage may be used during a verify operation for determining whether a threshold voltage of selected memory cells is increased to a target level. The verify voltage may be set to various levels according to the target level and may be applied to the selected word line. The read voltage may be applied to the selected word line during the read operation of the selected memory cells. For example, the read voltage may be set to have various levels according to a program method of the selected memory cells. The erase voltage may be used during the erase operation for erasing the memory cells included in the selected memory block, and may be applied to the source line SL.

The row decoder 130 may be configured to transmit the operation voltages Vop to the drain select lines DSL, the word lines WL, the source select lines SSL, and the source line SL connected to the selected memory block according to a row address RADD. For example, the row decoder 130 may be connected to the voltage generator 120 through global lines, and may be connected to the first to j-th memory blocks BLK1 to BLKj through the drain select lines DSL, the word lines WL, the source select lines SSL, and the source line SL.

The page buffer group 140 may include page buffers (not shown) respectively connected to the first to j-th memory blocks BLK1 to BLKj. Each of the page buffers (not shown) may be connected to the first to j-th memory blocks BLK1 to BLKj through the bit lines BL. During the program operation, the page buffers (not shown) may adjust a level of a voltage applied to the bit lines BL and a time when the voltage is applied to the bit lines BL in response to page buffer control signals PBSIG. In addition, the page buffers (not shown) may store data read from the memory cells by sensing a current or a voltage of the bit lines BL, and output the stored data. During the program operation, the page buffers (not shown) may apply a program allowable voltage or a program inhibit voltage to the bit lines BL. The program allowable voltage may be set to 0V or a negative voltage, and the program inhibit voltage may be set to a positive voltage. For example, the program inhibit voltage may be set to the same level as the precharge voltage.

The column decoder 150 may be configured so that data is transmitted between the page buffer group 140 and the input/output circuit 160 in response to a column address CADD. For example, the column decoder 150 may be connected to the page buffer group 140 through column lines CL and may transmit enable signals through the column lines CL. The page buffers (not shown) included in the page buffer group 140 may receive or output the data through data lines DL in response to the enable signals.

The input/output circuit 160 may be configured to receive or output a command CMD, an address ADD, or data through input/output lines I/O. For example, the input/output circuit 160 may transmit the command CMD and the address ADD received from an external controller through the input/output lines I/O to the control circuit 180, and transmit the data received from the external controller through the input/output lines I/O to the column decoder 150. Alternatively, the input/output circuit 160 may output the data received from the page buffer group 140 to the external controller through the input/output lines I/O.

The control circuit 180 may output the operation code OPCD, the row address RADD, the page buffer control signals PBSIG, and the column address CADD in response to the command CMD and the address ADD. For example, when the command CMD input to the control circuit 180 is a command corresponding to the program operation, the control circuit 180 may control the peripheral circuit 170 to perform the program operation of the memory block selected by the address ADD. When the command CMD input to the control circuit 180 is a command corresponding to the read operation, the control circuit 180 may control the peripheral circuit 170 to perform the read operation of the memory block selected by the address and output the read data. When the command CMD input to the control circuit 180 is a command corresponding to the erase operation, the control circuit 180 may control the peripheral circuit 170 to perform the erase operation of the selected memory block. For example, during the program operation, the control circuit 180 may output the operation code OPCD so that the operation voltages Vop may be generated according to an algorithm of a precharge step, a program voltage apply step, and a verify step.

According to the present embodiment, the control circuit 180 may output the operation code OPCD so that the turn on voltage is applied to the source select lines SSL or the drain select lines DSL during a partial period of the precharge step. The operation code OPCD may be output so that the negative voltage is applied to the source select lines SSL or the drain select lines DSL in a remaining period of the precharge step. In the precharge step, the control circuit 180 may output the operation code OPCD so that the pass voltage, a 0V voltage, or the negative voltage is applied to the word lines WL.

Figure 2:
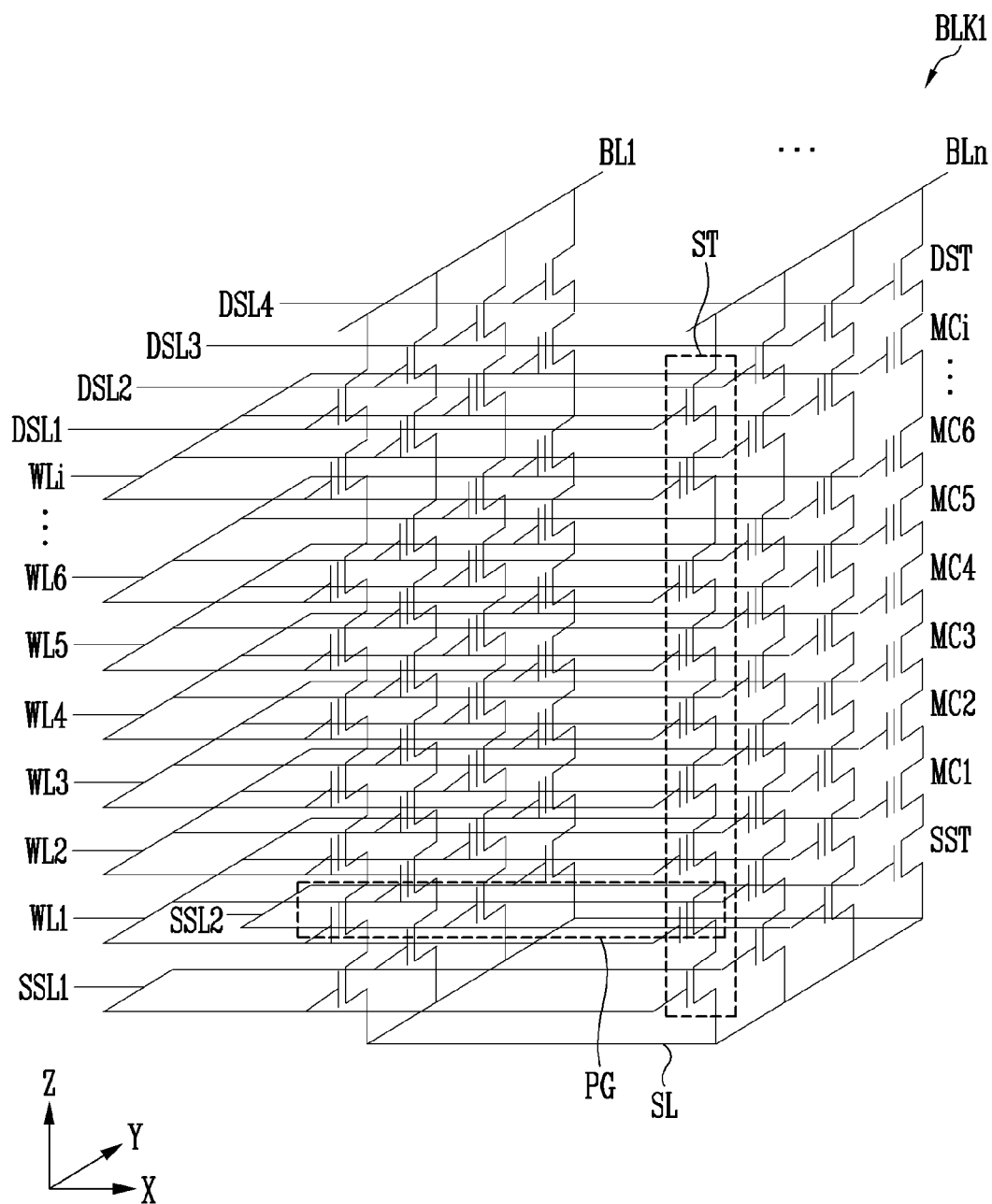
FIG. 2 is a diagram illustrating a connection relationship of a memory block and a page buffer group.

FIG. 2 is a diagram illustrating a connection relationship of the memory block and the page buffer group.

Referring to FIGS. 1 and 2, since the first to j-th memory blocks BLK1 to BLKj are identically configured, the first memory block BLK1 is shown in FIG. 2 among the first to j-th memory blocks BLK1 to BLKj. The first memory block BLK1 includes strings ST connected between first to n-th bit lines BL1 to BLn and the source line SL. Since the first to n-th bit lines BL1 to BLn extend along a Y direction and are spaced apart from each other along an X direction, the strings ST may extend along a Z direction and may be spaced apart from each other along the X and Y directions.

When describing any one string ST among the strings ST connected to the n-th bit line BLn as an example, the string ST may include a source select transistor SST, first to i-th memory cells MC1 to MCi, and a drain select transistor DST. Since the first memory block BLK1 shown in FIG. 2 is a diagram for schematically describing a structure of the memory block, the number of the source select transistors SST, the first to i-th memory cells MC1 to MCi, and the drain select transistors DST included in the strings ST may be changed according to the memory device.

Gates of the source select transistors SST included in different strings ST may be connected to first and second source select lines SSL1 and SSL2, gates of the first to i-th memory cells MC1 to MCi may be connected to first to i-th word lines WL1 to WLi, and gates of the drain select transistors DST may be connected to first to fourth drain select lines DSL1 to DSL4.

Among the first to i-th memory cells MC1 to MCi, memory cells formed on the same layer may be connected to the same word line. For example, the first memory cells MC1 included in different strings ST may be commonly connected to the first word line WL1, and the i-th memory cells included in different strings ST may be common connected to the i-th word line WLi. A group of memory cells included in different strings ST and connected to the same word line becomes a page PG. The program and read operations may be performed in a unit of the page PG, and the erase operation may be performed in a unit of the memory block.

Figure 3:
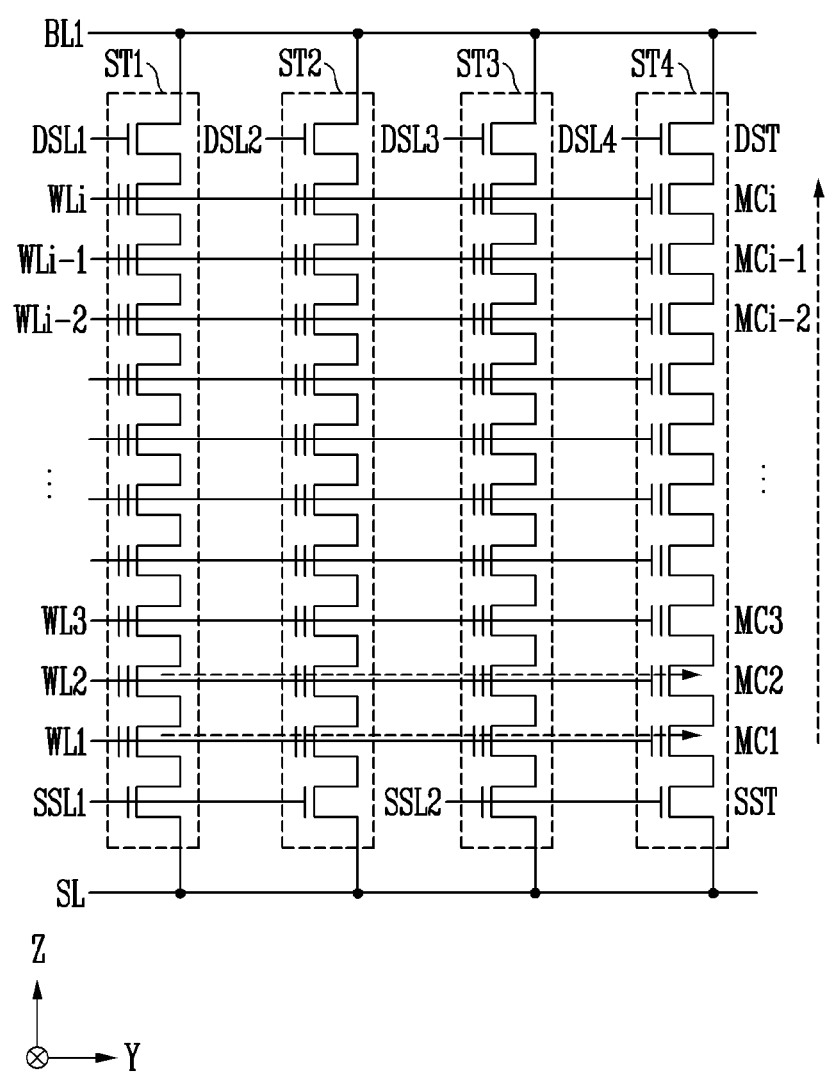
FIG. 3 is a diagram illustrating a program operation sequence performed in the memory block.

FIG. 3 is a diagram illustrating a program operation sequence performed in the memory block.

Referring to FIG. 3, strings connected to the first bit line BL1 among the strings ST shown in FIG. 2 are shown. The program operation may be performed on a string selected according to a selected drain select line among the first to fourth drain select lines DSL1 to DSL4. For example, when the first drain select line DSL1 is the selected drain select line, a first string ST1 may become a selected string. At this time, since the remaining second to fourth drain select lines DSL2 to DSL4 become unselected drain select lines, second to fourth strings ST2 to ST4 may become unselected strings.

The program operation may be performed in the Y direction or the Z direction. For example, it is assumed that the first word line WL1 is the selected word line and the first to fourth strings ST1 to ST4 are sequentially selected. When the first word line WL1 is the selected word line, the remaining second to i-th word lines WL2 to WLi may become the unselected word lines. After the first memory cell MC1 included in the first string ST1 is programmed, the first memory cell MC1 included in the second string ST2 may be programmed. When the first or second strings ST1 or ST2 are the selected strings, the first source select line SSL1 connected to the first and second strings ST1 and ST2 may become a selected source select line, and the second source select line SSL2 may be an unselected source select line. In such a method, when the first memory cells MC1 connected to the first word line WL1 are programmed, the selected word line may be changed to the second word line WL2, and the second memory cells MC2 connected to the second word line WL2 may be programmed.

When it is assumed that the program operation is performed according to the above-described sequence, the first to i-th memory cells MC1 to MCi may be sequentially programmed in the same string. Therefore, a sequence of the program operation may be variously changed according to the memory device in addition to the above-described sequence.

Figure 4:
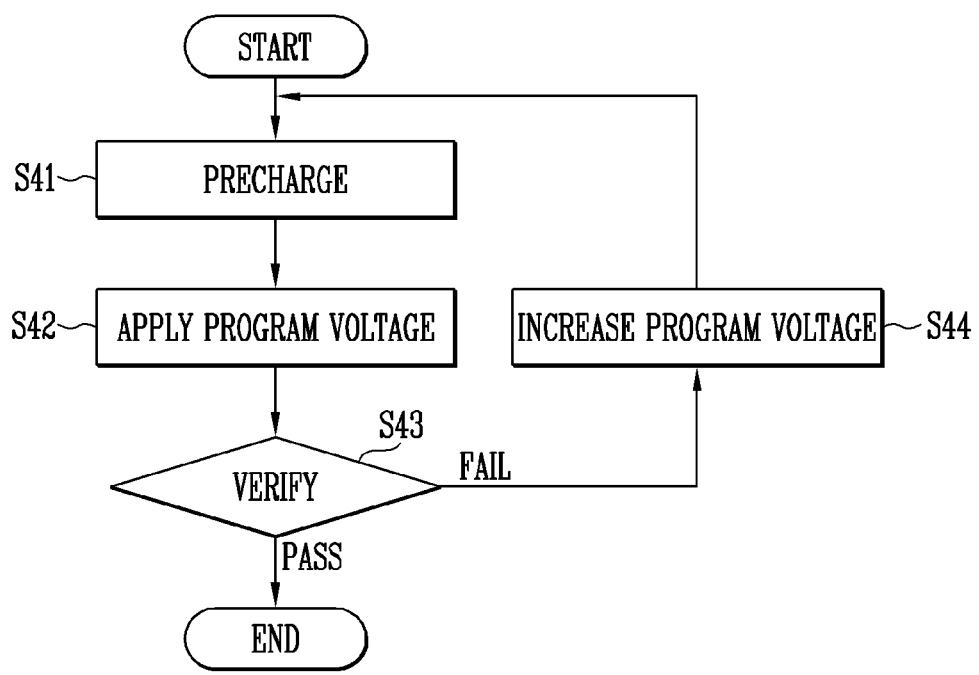
FIG. 4 is a flowchart illustrating a program operation.

FIG. 4 is a flowchart illustrating the program operation.

Referring to FIG. 4, the program operation may include a precharge step (S41), a program voltage apply step (S42), a verify step (S43), and a program voltage increase step (S44).

In the precharge step S41, channel layers of the unselected strings may be precharged to a positive voltage level, and the program allowable voltage may be applied to channel layers of the selected strings. In the precharge step S41 of the present embodiment, the channel layers of the unselected strings may be precharged by directly transferring the precharge voltage applied to the source line to the channel layers and moving a positive charge to the channel layers. Directly transferring the precharge voltage to the channel layers may be transferring the negative charge to the channel layers. In other words, electrons may move to the channel layers, and thus a potential of the channel may be increased. Moving the positive charge to the channel layers may be moving holes to the channel layers. As the holes move to the channel layers, the potential of the channel may be increased.

When the channel layers of the unselected strings are precharged, the program voltage apply step (S42) may be performed. In the program voltage apply step (S42), the program voltage may be applied to the selected word line connected to the selected page. When the program voltage is applied to the selected word line, the threshold voltage of the selected memory cells included in the selected strings may be increased. At this time, the pass voltage may be applied to the unselected word lines.

In the verify step S43, it may be determined whether or not the program of the selected memory cells included in the selected page is completed. For example, the verify voltage may be applied to the selected word line, and the pass voltage may be applied to the unselected word lines. When all threshold voltages of the selected memory cells reach the target level, the verify step (S43) may be passed (pass), and when cells of which a threshold voltage does not reach the target level among the selected memory cells, the verify step (S43) may be failed (fail)

When the verify step is failed, the program voltage increase step (S44) may be performed. In the program voltage increase step (S44), the program voltage used in a previous program loop may be set as high as a step voltage. The step voltage may be a voltage set in the memory device and may be constant regardless of the number of program loops or may be set to be decreased in stages as the number of program loops increases.

When the program voltage increases by the step voltage, the precharge step (S41) may be performed again.

In the method described above, steps S41 to S44 may be repeated until the verify step S43 is passed. When the verify step (S43) is passed, a next page may be newly selected, and the above-described steps S41 to S44 may also be performed on the newly selected page.

Figure 5:
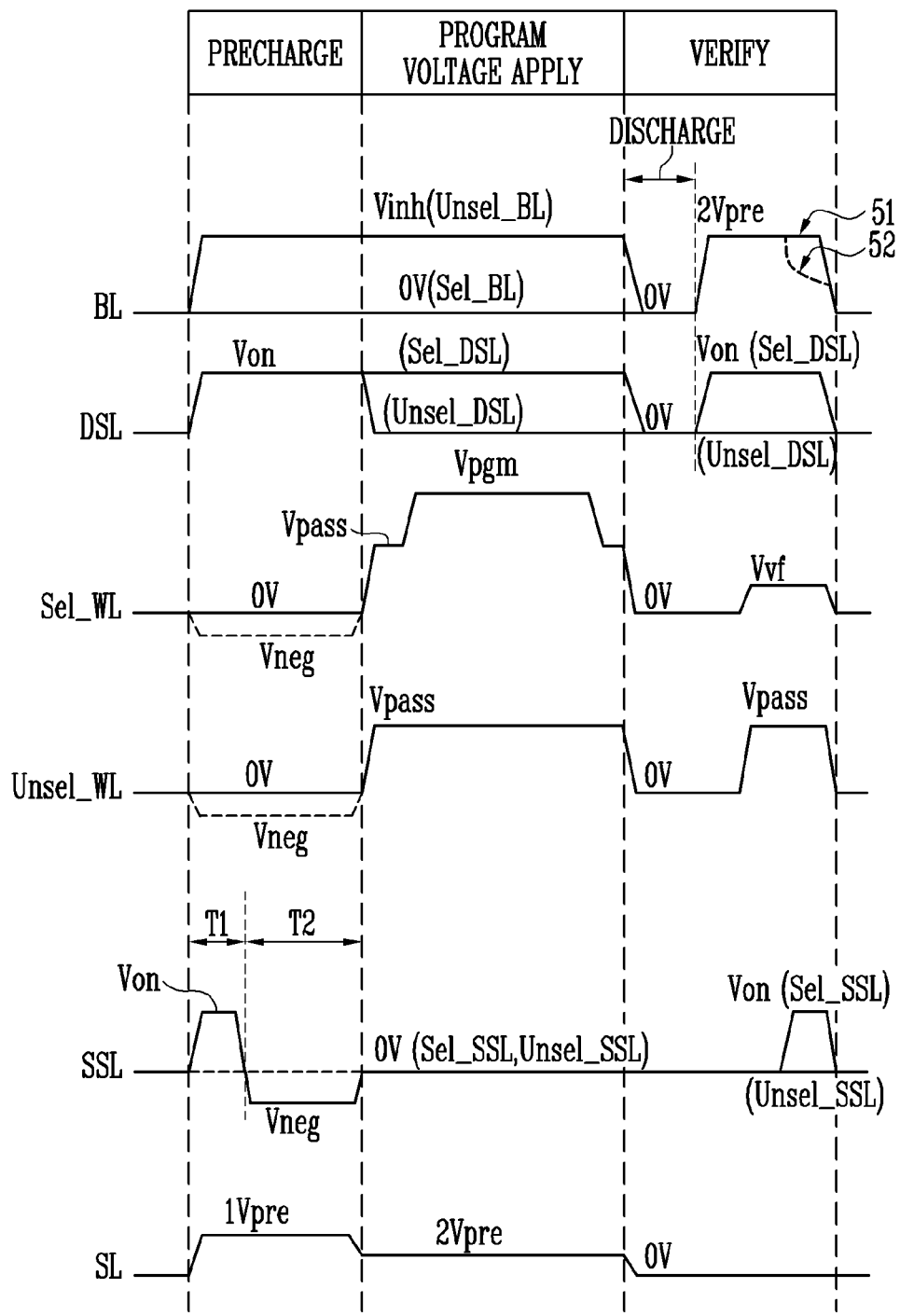
FIG. 5 is a diagram illustrating a program operation according to a first embodiment of the present disclosure.

FIG. 5 is a diagram illustrating a program operation according to a first embodiment of the present disclosure.

Referring to FIG. 5, in the program operation according to the first embodiment, the precharge step may be performed in a sequence in which a negative voltage Vneg is applied after a turn on voltage Von is applied to the source select lines SSL. The program operation according to the first embodiment is specifically described as follows.

When the precharge step is started, 0V which is the program allowable voltage may be applied to selected bit lines Sel_BL, and a program inhibit voltage Vinh higher than 0V may be applied to unselected bit lines Unsel_BL. In an embodiment, when the precharge step is started, 0V which is the program allowable voltage may be applied to selected bit lines Sel_BL, and a first precharge voltage 1Vpre higher than 0V or a second precharge voltage 2Vpre higher than 0V may be applied to unselected bit lines Unsel_BL. In order to transfer the voltages applied to the selected bit lines Sel_BL and the unselected bit lines Unsel_BL to the selected strings and the unselected strings, the turn on voltage Von may be applied to the drain select lines DSL. For example, the turn on voltage Von may be applied to a selected drain select line Sel_DSL and unselected drain select lines Unsel_DSL. The turn on voltage Von may be set to a positive voltage higher than 0V.

A 0V voltage or the negative voltage Vneg lower than 0V may be applied to a selected word line Sel_WL and unselected word lines Unsel_WL.

In a state in which a first precharge voltage 1Vpre is applied to the source line SL, the turn on voltage Von may be applied to the source select lines SSL. For example, the turn on voltage Von may be applied to a selected source select line Sel_SSL and an unselected source select line Unsel_SSL. The turn on voltage Von may be applied to the source select lines SSL during a first time T1 in a precharge period (i.e., PRECHARGE). After the turn on voltage Von is applied during the first time T1 in the state in which the first precharge voltage 1Vpre is applied to the source line SL, the negative voltage Vneg lower than 0V may be applied to the source select lines SSL. That is, the turn on voltage Von applied to the source select lines SSL may be decreased to the negative voltage Vneg. The negative voltage Vneg may be applied to the source select lines SSL during a second time T2 longer than the first time T1. For example, the second time T2 may be set longer than the first time T1 at least twice. The negative voltage Vneg applied to the word lines Sel_WL and Unsel_WL may be the same as the negative voltage Vneg applied to the source select lines SSL or may be set to a voltage between the negative voltage Vneg applied to the source select lines SSL and 0V. A method of applying a voltage to the source select lines SSL in the precharge period is more specifically described as follows.

When the turn on voltage Von is applied to the source select lines SSL during the first time T1, since the source select transistors are turned on by the turn on voltage Von, the first precharge voltage 1Vpre applied to the source line SL may be transferred to the channel layers. That is, electrons may move to the channel layers of the strings, and thus the potential of the channel may be increased. In the precharge period using the turn on voltage Von, the potential of the channel layers may be increased quickly, but as the number of programmed memory cells increases, the number of electrons that might not pass through the channel may increase, and thus the potential of the channel may be decreased as a distance from the source line SL increases.

In the first embodiment, a period for applying the negative voltage Vneg to the source select lines SSL may be added in order to mitigate a decrease of the potential of the channel, which is a disadvantage of the precharge period using the turn on voltage Von. When the negative voltage Vneg is applied to the source select lines SSL, a leakage current may be generated in the source select transistors by the negative voltage Vneg, and holes generated by the leakage current may move to the channel layers. That is, the potential of the channel layers may be increased by the holes input to the channel layers. Since the holes are not affected by the threshold voltage of the memory cells, the potential of the channel layers may be increased to a constant level regardless of the number of programmed memory cells. However, a long time may be required for the holes to move to an end of the channel layer. Therefore, the precharge period using the turn on voltage Von may be performed during the first time T1, and the precharge period using the negative voltage Vneg may be performed during the second time T2 longer than the first time T1. The first time T1 may be set to a time shorter than a time set in the existing precharge period in which only the turn on voltage Von is used.

When the precharge step is ended, the program voltage apply step (i.e., PROGRAM VOLTAGE APPLY) may be performed.

When the program voltage apply step is started, the 0V voltage may be applied to the unselected drain select lines Unsel_DSL, the selected source select line Sel_SSL, and the unselected source select line Unsel_SSL. When the 0V voltage is applied to the unselected drain select lines Unsel_DSL, the selected source select line Sel_SSL, and the unselected source select line Unsel_SSL, a select transistor connected to the unselected drain select lines Unsel_DSL, the selected source select line Sel_SSL, and the unselected source select line Unsel_SSL may be turned off. Therefore, the unselected strings may be floated.

The first precharge voltage 1Vpre applied to the source line SL may be decreased to a second precharge voltage 2Vpre, and the pass voltage Vpass may be applied to the selected word line Sel_WL and the unselected word lines Unsel_WL. When the 0V voltage or the negative voltage Vneg is applied to the selected word line Sel_WL and the unselected word lines Unsel_WL in the precharge period, which is a previous period, and then the pass voltage Vpass having a positive voltage is applied to the selected word line Sel_WL and the unselected word lines Unsel_WL in the program voltage apply period, channel boosting may occur in the unselected strings.

When the pass voltage Vpass is applied during a predetermined time, a program voltage Vpgm may be applied to the selected word line Sel_WL. When the program voltage Vpgm is applied to the selected word line Sel_WL, a voltage difference between the potential of the channel layers of the selected strings and the program voltage Vpgm increases, and thus the threshold voltage of the selected memory cells may be increased. At this time, since the unselected strings are floated, the voltage difference between the potential of the channel layers and the program voltage Vpgm is lower than that of the selected strings. Therefore, the threshold voltage of the unselected memory cells included in the unselected strings is not be increased. When the program voltage Vpgm is applied during a predetermined time, a potential of the selected word line Sel_WL may be decreased by applying the pass voltage Vpass to the selected word line Sel_WL. When the program voltage apply step is ended, the verify step (i.e., VERIFY) may be performed. The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In the verify step, since the threshold voltage of the selected memory cells is required to be accurately sensed, the bit lines BL, the drain select lines DSL, the word lines Sel_WL and Unsel_WL, the source select lines SSL, and the source line SL may be discharged and initialized. When all lines are discharged, the second precharge voltage 2Vpre may be applied to the bit lines BL, and the turn on voltage Von may be applied to the selected drain select line Sel_DSL. The 0V voltage may be continuously applied to the unselected drain select lines Unsel_DSL.

Subsequently, the pass voltage Vpass may be applied to the unselected word lines Unsel_WL, and a verify voltage Vvf may be applied to the selected word line Sel_WL. When the verify voltage Vvf is applied to the selected word line Sel_WL, the source select transistors may be turned on by applying the turn on voltage Von to the selected source select line Sel_SSL. The 0V voltage may be continuously applied to the unselected source select line Unsel_SSL. When the selected source select transistors are turned on in a state in which the 0V voltage is applied to the source line SL, a voltage of the bit lines BL may be maintained as the second precharge voltage 2Vpre (51) or may be decreased (52) according to the threshold voltage of the memory cells. For example, since the threshold voltage of the memory cells on which the program is completed is higher than the verify voltage Vvf, the memory cells on which the program is completed are turned off. Since the bit lines BL and the source line SL are electrically blocked from each other by the turned-off memory cells, the potential of the bit lines BL may be maintained as the second precharge voltage 2Vpre (51). Since the threshold voltage of the memory cells on which the program is not completed is lower than the verify voltage Vvf, the memory cells which are not programmed are turned on. Since the bit lines BL and the source line SL are electrically connected to each other by the turned-on memory cells, the potential of the bit lines BL may be lower than the second precharge voltage 2Vpre (52).

Among the above-described steps, since the channel layers of the strings are precharged in various methods by the voltage applied to the source select lines SSL in the precharge step, each of methods of precharging the channel layers is specifically described as follows.

Figure 6A:
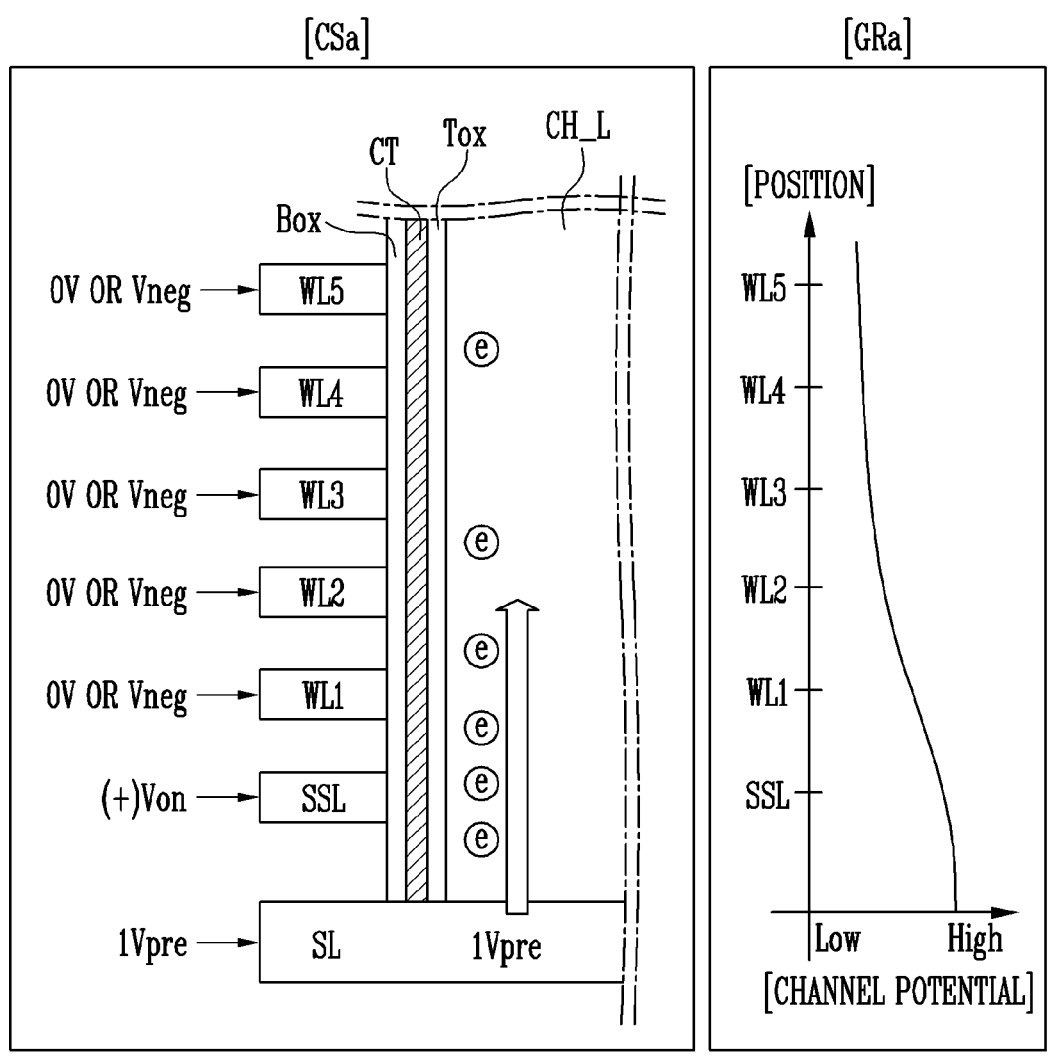
FIG. 6A is a diagram illustrating a precharge operation of a turn on method.

FIG. 6A is a diagram illustrating a precharge operation of a turn on method.

Referring to FIG. 6A, a cross section CSa of a string and a graph GRa illustrating a channel potential according to a position of a channel are shown.

On the source line SL, the source select line SSL and the word lines WL1 to WL5 may be stacked to be spaced apart from each other, and a blocking layer Box, a charge trap layer CT, a tunnel insulating layer Tox, and a channel layer CH_L may vertically pass through the word lines WL1 to WL5 and the source select line SSL. The source select line SSL and the word lines WL1 to WL5 may be formed of a conductive layer. The blocking layer Box and the tunnel insulating layer Tox may be formed of an oxide layer, and the charge trap layer CT may be formed of a nitride layer. The channel layer CH_L may be formed of a conductive layer such as doped polysilicon.

When the 0V voltage is applied to the word lines WL1 to WL5 and the turn on voltage Von higher (+) than 0V is applied to the source select line SSL, electrons e may move through the channel layer CH_L. That is, since the source select transistors are turned on by the turn on voltage Von applied to the source select lines SSL, the first precharge voltage 1Vpre supplied to the source line SL may be applied to the channel layer CH_L through the channel. When the source select transistors are turned on, since the source line SL and the channel layer CH_L are electrically connected directly, the electrons e may move to the channel layer CH_L and thus the strings may be precharged. However, as the number of programmed memory cells in the strings increases, a period in which the threshold voltage is high occurs. Therefore, as a distance from the source select line SSL increases, the number of electrons e that might not pass through the channel layer CH_L may increase. Accordingly, the channel potential may be decreased from high to low as the distance from the source select line SSL increases.

Therefore, in the first embodiment, the turn on method and a gate induced drain leakage (GIDL) method may be selectively used to ensure a precharge level of the channel layers. The GIDL method is specifically described as follows.

Figure 6B:
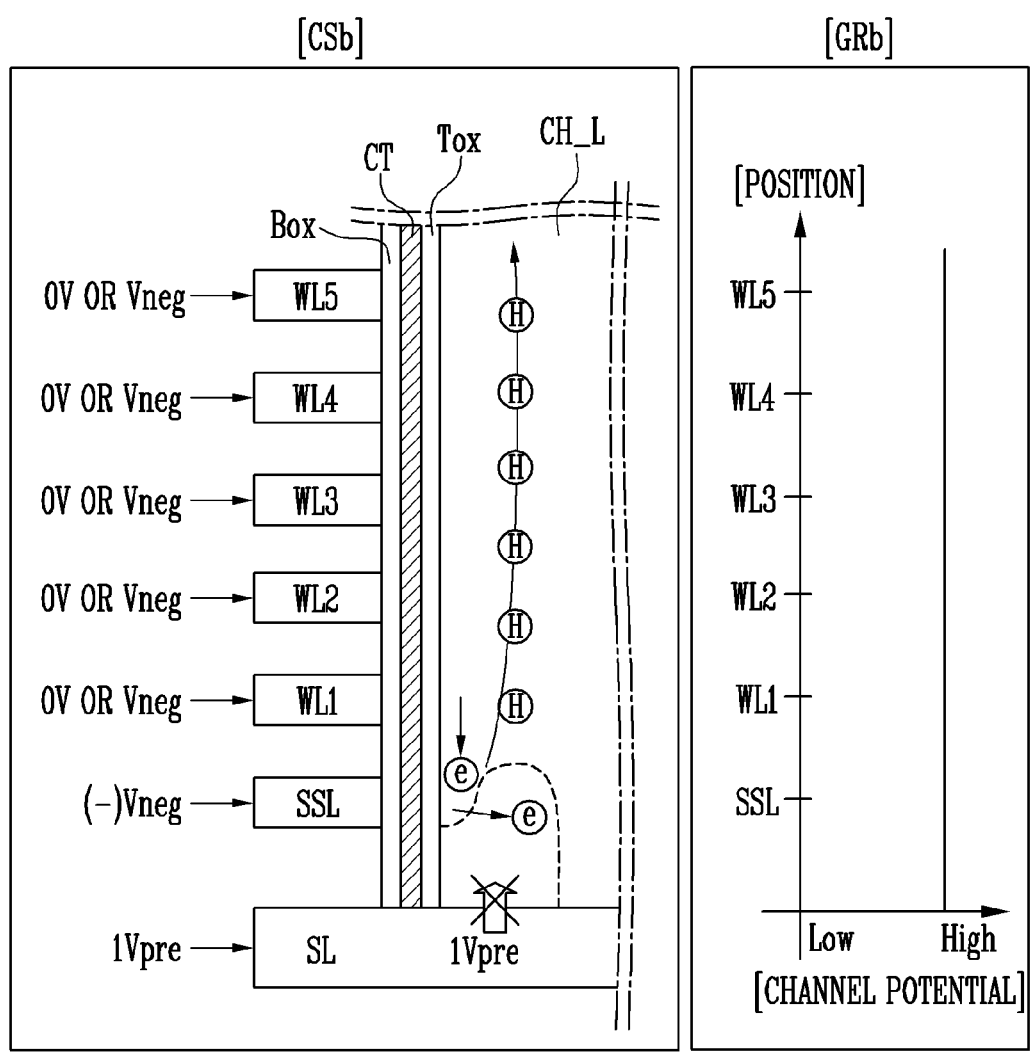
FIG. 6B is a diagram illustrating a precharge operation of a gate induced drain leakage (GIDL) method.

FIG. 6B is a diagram illustrating a precharge operation of the GIDL method.

Referring to FIG. 6B, a cross section CSb of a string and a graph GRb illustrating a channel potential according to a position of a channel are shown.

Even though the 0V voltage is applied to the word lines WL1 to WL5, when the negative voltage Vneg lower (−) than 0V is applied to the source select lines SSL, a leakage current may occur in the channel layer CH_L adjacent to the source select transistors. For example, when the negative voltage Vneg is applied to the source select lines SSL, the electrons e of the channel layer CH_L may move to an area far from the tunnel insulating layer Tox. At this time, holes H may be introduced into the channel layer CH_L while the electrons e positioned in another area of the channel layer CH_L move in a direction of the source select line SSL. Since the holes H are not affected by the threshold voltage, the holes H generated by the source select transistor move along the channel layer CH_L, and thus the channel layer CH_L may be precharged. Since the holes H generated by GIDL are generated in the source select transistors included in each of the strings, the channel layer CH_L of the unselected strings may be precharged to a constant level.

Figure 7:
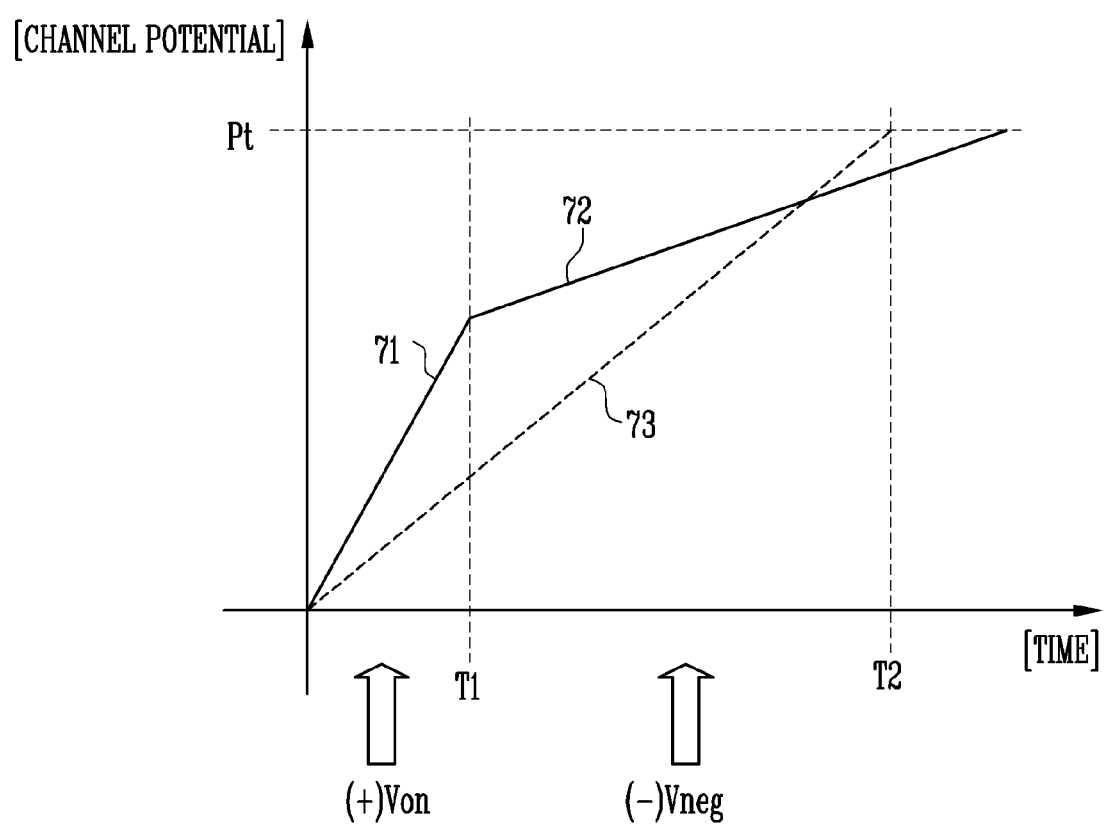
FIG. 7 is a diagram illustrating a potential change of a channel layer according to the first embodiment of the present disclosure.

FIG. 7 is a diagram illustrating a potential change of the channel layer according to the first embodiment of the present disclosure.

Referring to FIG. 7, since there are many erased memory cells at the beginning of the program operation, the potential of the channel layer may be quickly increased by a turn on method 71. That is, in the turn on method 71, since the turn on voltage Von higher (+) than 0V is applied to the source select lines, the precharge voltage supplied to the source line may be directly transferred to the channel layer.

However, since the number of programmed memory cells increases as the program operation is progressed, a time required for the potential of the channel layer to increase to a target potential Pt may increase (72).

Therefore, as in the first embodiment, when the channel layer is precharged using the turn on method 71 during the first time T1 and then the channel layer is precharged using the GIDL method 73 during the second time T2, the potential of the channel layer may be increased to the target potential Pt within the second time T2.

Accordingly, in an embodiment, even though the number of unselected strings increases, a maximum time required for the channel layer to be precharged may increase or a reduction of channel boosting may be suppressed.

Figure 8:
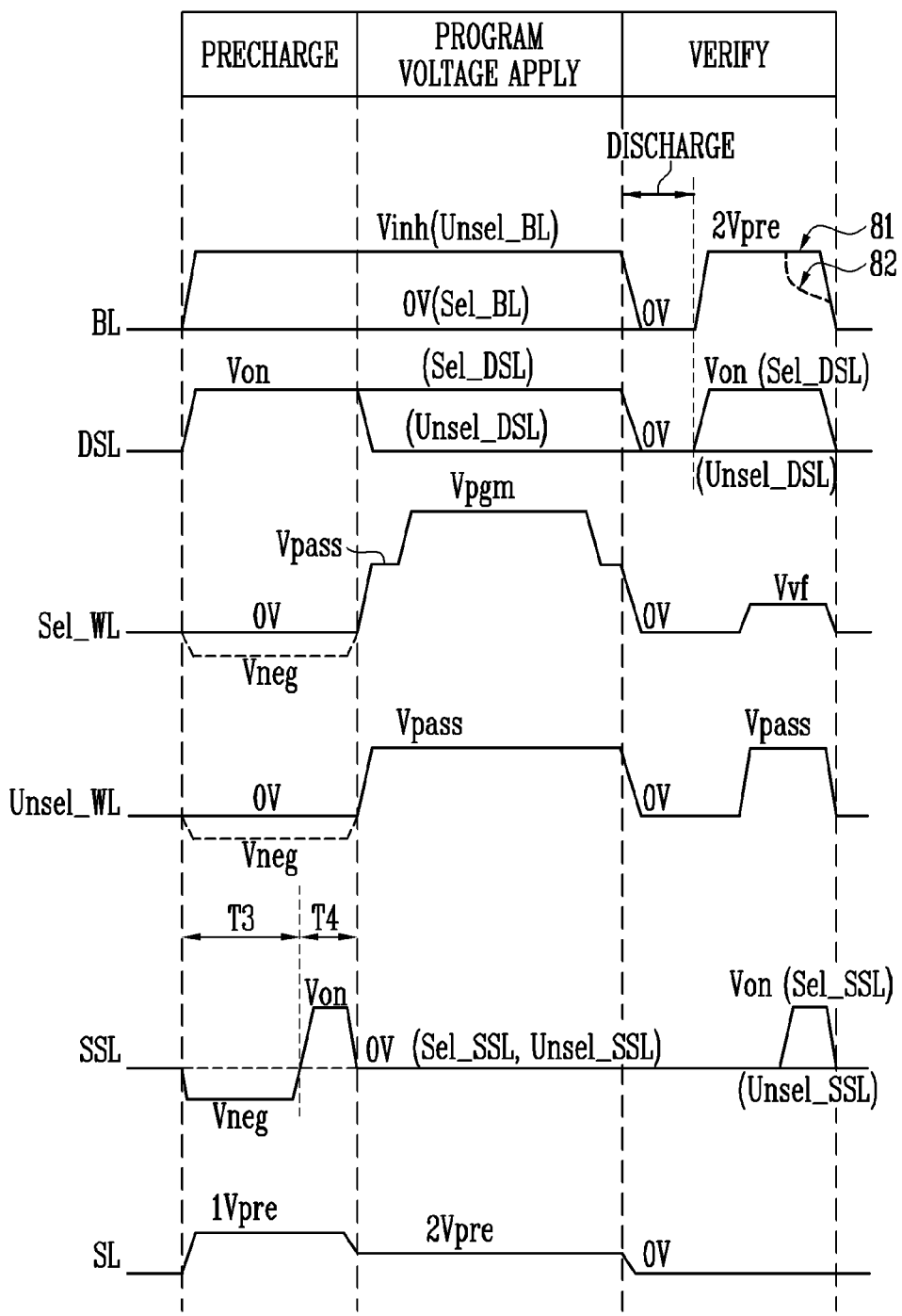
FIG. 8 is a diagram illustrating a program operation according to a second embodiment of the present disclosure.

FIG. 8 is a diagram illustrating a program operation according to a second embodiment of the present disclosure.

Referring to FIG. 8, in the program operation according to the second embodiment, the precharge step may be performed in a sequence in which the turn on voltage Von is applied after the negative voltage Vneg is applied to the source select lines SSL. The program operation according to the second embodiment is specifically described as follows.

When the precharge step is started, 0V, which is the program allowable voltage may be applied to the selected bit lines Sel_BL, and the program inhibit voltage Vinh higher than 0V may be applied to the unselected bit lines Unsel_BL. In an embodiment, when the precharge step is started, 0V which is the program allowable voltage may be applied to selected bit lines Sel_BL, and a first precharge voltage 1Vpre higher than 0V or a second precharge voltage 2Vpre higher than 0V may be applied to unselected bit lines Unsel_BL. In order to transfer the voltages applied to the selected bit lines Sel_BL and the unselected bit lines Unsel_BL to the selected strings and the unselected strings, the turn on voltage Von may be applied to the drain select lines DSL. For example, the turn on voltage Von may be applied to the selected drain select line Sel_DSL and the unselected drain select lines Unsel_DSL. The turn on voltage Von may be set to a positive voltage higher than 0V.

A 0V voltage or the negative voltage Vneg lower than 0V may be applied to the selected word line Sel_WL and the unselected word lines Unsel_WL. In a state in which the first precharge voltage 1Vpre is applied to the source line SL, the negative voltage Vneg lower than 0V may be applied to the source select lines SSL. For example, the negative voltage Vneg may be applied to the selected source select line Sel_SSL and the unselected source select line Unsel_SSL. The negative voltage Vneg may be applied to the source select lines SSL during a third time T3 in the precharge period. The third time T3 may be the same as the second time T2 described with reference to FIG. 5. After the negative voltage Vneg is applied to the source select lines SSL during the third time T3 in the state in which the first precharge voltage 1Vpre is applied to the source line SL, the turn on voltage Von higher than 0V may be applied to the source select lines SSL. The turn on voltage Von may be applied to the source select lines SSL during a fourth time T4 shorter than the third time T3. For example, the fourth time T4 may be set shorter than the third time T3 at least ½. Alternatively, the fourth time T4 may be the same as the first time T1 described with reference to FIG. 5. The negative voltage Vneg applied to the word lines Sel_WL and Unsel_WL may be the same as the negative voltage Vneg applied to the source select lines SSL or may be set to a voltage between the negative voltage Vneg applied to the source select lines SSL and 0V.

After the third time T3 elapses, when the turn on voltage Von is applied to the source select lines SSL, since the source select transistors are turned on by the turn on voltage Von, the first precharge voltage 1Vpre applied to the source line SL may be transferred to the channel layers. That is, electrons may move to the channel layers of the strings, and thus the potential of the channel may be increased. In the beginning of the program operation, the potential of the channel layers may be increased quickly in the precharge period using the turn on voltage Von, but as the number of programmed memory cells increases, the number of electrons that might not pass through the channel may increase, and thus the potential of the channel may be decreased as a distance from the source line SL increases.

Therefore, a disadvantage in which the negative voltage Vneg or the turn on voltage Von is used may be supplemented, by selectively performing the precharge operation using the negative voltage Vneg and the precharge operation using the turn on voltage Von, as in the second embodiment.

When the precharge step is ended, the program voltage apply step may be performed.

When the program voltage apply step is started, the 0V voltage may be applied to the unselected drain select lines Unsel_DSL, the selected source select line Sel_SSL, and the unselected source select line Unsel_SSL. When the 0V voltage is applied to the unselected drain select lines Unsel_DSL, the selected source select line Sel_SSL, and the unselected source select line Unsel_SSL, the select transistor connected to the unselected drain select lines Unsel_DSL, the selected source select line Sel_SSL, and the unselected source select line Unsel_SSL may be turned off. Therefore, the unselected strings may be floated.

The first precharge voltage 1Vpre applied to the source line SL may be decreased to the second precharge voltage 2Vpre, and the pass voltage Vpass may be applied to the selected word line Sel_WL and the unselected word lines Unsel_WL. When the 0V voltage or the negative voltage Vneg is applied to the selected word line Sel_WL and the unselected word lines Unsel_WL in the precharge period, which is a previous period, and then the pass voltage Vpass having a positive voltage is applied to the selected word line Sel_WL and the unselected word lines Unsel_WL in the program voltage apply period, channel boosting may occur in the unselected strings.

When the pass voltage Vpass is applied during a predetermined time, the program voltage Vpgm may be applied to the selected word line Sel_WL. When the program voltage Vpgm is applied to the selected word line Sel_WL, a voltage difference between the potential of the channel layers of the selected strings and the program voltage Vpgm increases, and thus the threshold voltage of the selected memory cells may be increased. At this time, since the unselected strings are floated, the voltage difference between the potential of the channel layers and the program voltage Vpgm is lower than that of the selected strings. Therefore, the threshold voltage of the unselected memory cells included in the unselected strings is not be increased. When the program voltage Vpgm is applied during a predetermined time, a potential of the selected word line Sel_WL may be decreased by applying the pass voltage Vpass to the selected word line Sel_WL.

When the program voltage apply step is ended, the verify step may be performed.

In the verify step, since the threshold voltage of the selected memory cells is required to be accurately sensed, the bit lines BL, the drain select lines DSL, the word lines Sel_WL and Unsel_WL, the source select lines SSL, and the source line SL may be discharged and initialized. When all lines are discharged, the second precharge voltage 2Vpre may be applied to the bit lines BL, and the turn on voltage Von may be applied to the selected drain select line Sel_DSL. The 0V voltage may be continuously applied to the unselected drain select lines Unsel_DSL.

Subsequently, the pass voltage Vpass may be applied to the unselected word lines Unsel_WL, and the verify voltage Vvf may be applied to the selected word line Sel_WL. When the verify voltage Vvf is applied to the selected word line Sel_WL, the source select transistors may be turned on by applying the turn on voltage Von to the selected source select line Sel_SSL. The 0V voltage may be continuously applied to the unselected source select line Unsel_SSL. When the selected source select transistors are turned on in a state in which the 0V voltage is applied to the source line SL, the voltage of the bit lines BL may be maintained as the second precharge voltage 2Vpre (81) or may be decreased (82) according to the threshold voltage of the memory cells. For example, since the threshold voltage of the memory cells on which the program is completed is higher than the verify voltage Vvf, the memory cells on which the program is completed are turned off. Since the bit lines BL and the source line SL are electrically blocked from each other by the turned-off memory cells, the potential of the bit lines BL may be maintained as the second precharge voltage 2Vpre (81). Since the threshold voltage of the memory cells on which the program is not completed is lower than the verify voltage Vvf, the memory cells which are not programmed are turned on. Since the bit lines BL and the source line SL are electrically connected to each other by the turned-on memory cells, the potential of the bit lines BL may be lower than the second precharge voltage 2Vpre (82).

Figure 9:
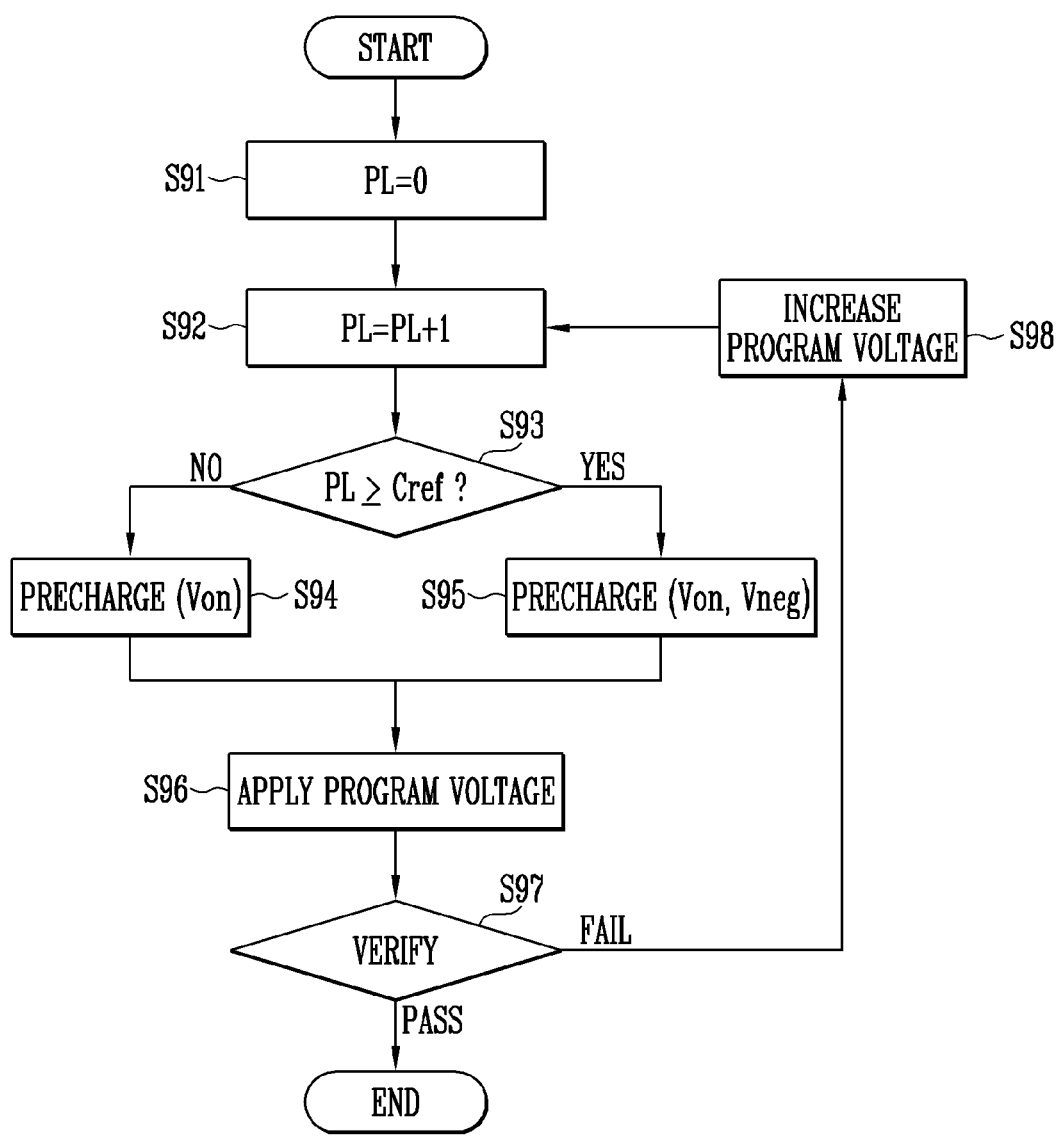
FIG. 9 is a flowchart illustrating a program operation according to a third embodiment of the present disclosure.

FIG. 9 is a flowchart illustrating a program operation according to a third embodiment of the present disclosure.

Referring to FIG. 9, in the third embodiment, during the program operation of the selected page, when the number of program loops is less than a reference number, the precharge step may be performed in the turn on method, and when the number of program loops is greater than the reference number, the precharge step may be performed by mixing the turn on method and the GIDL method.

The program operation according to the third embodiment is specifically described as follows.

When the program operation of the selected page is started, the number PL of program loops is set to 0 (S91). The program loop may include a precharge step, a program voltage apply step, and a verify step. When the program loop is started, the number PL of program loops is set to the number obtained by increasing 1 to the number PL of previous program loops (S92).

The number PL of program loops and the reference count Cref are compared with each other (S93). When the number PL of program loops is less than the reference number Cref (No), the precharge step may be performed only in the turn on method using the turn on voltage Von (S94). The reference number Cref may be set differently according to the memory device. For example, the reference number Cref may be set in a test operation of the memory device. In the test operation, the number of program loops in which a time required for the precharge step of the turn on method rapidly increases may be set as the reference number.

In step S93, when the number PL of program loops is equal to or greater than the reference number Cref (Yes), the precharge step combining the turn on method using the turn on voltage Von and the GIDL method using the negative voltage Vneg may be performed (S95).

After the precharge step is performed in step S94 or step S95, applying the program voltage to the selected word line may be performed (S96). When the program voltage is applied to the selected word line during a predetermined time, the verify step of determining the threshold voltage of the selected memory cells may be performed (S97).

When the verify step (S97) is failed, increasing the program voltage is performed (S98), and since a next program loop is required to be performed, the number of program loops is set to a number obtained by increasing the number of previous program loops by 1 (S92).

Steps S91 to S98 may be performed in the above-described method, and when the verify step is passed in step S97, the program operation of the selected page may be ended.

Figure 10:
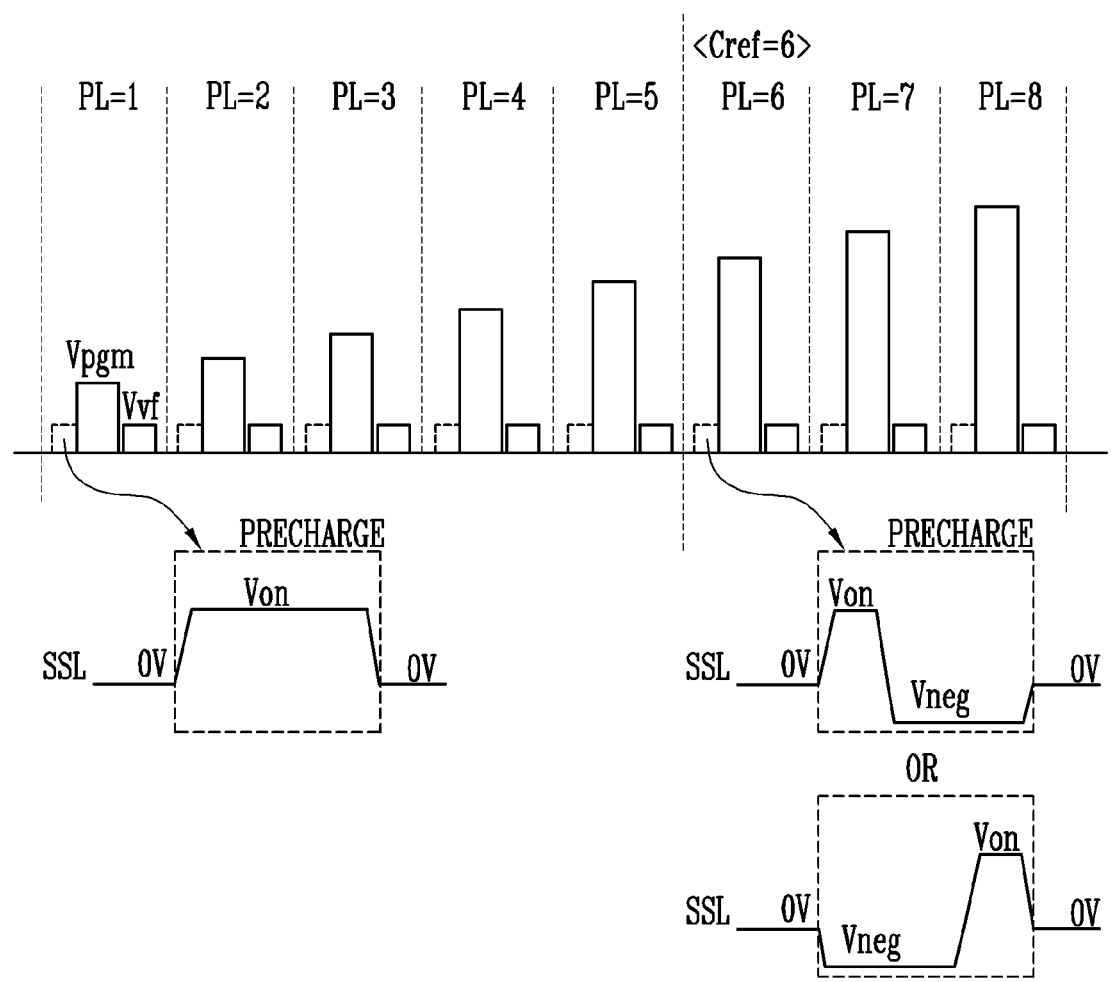
FIG. 10 is a diagram illustrating program loops according to the third embodiment of the present disclosure.

FIG. 10 is a diagram illustrating the program loops according to the third embodiment of the present disclosure.

Referring to FIG. 10, a program operation in which the reference number Cref is set to 6 is shown as an example.

In a period where the number PL of program loops is 1 to 5, the precharge step may be performed in the turn on method. For example, the program loop may include a precharge step of precharging the channel layers of the unselected strings, program voltage apply step of applying the program voltage to the selected word line to increase the threshold voltage of the selected memory cells, and verify step for determining the threshold voltage of the selected memory cells. When the precharge step is performed in the turn on method, the turn on voltage Von higher than 0V may be applied to the source select lines SSL. When the turn on voltage Von is applied to the source select lines SSL, since the source select transistors are turned on, the precharge voltage supplied to the source lines is transferred to the channel layers, and thus the channel layers may be precharged.

When the number PL of program loops is 6, which is the same as the reference number Cref, the precharge step may be performed in a method in which the turn on method and the GIDL method are mixed. For example, after the turn on voltage Von higher than 0V is applied to the source select lines SSL during a predetermined time, the negative voltage Vneg lower than 0V may be applied to the source select lines SSL. When the turn on voltage Von is applied to the source select lines SSL, since the source select transistors are turned on by the turn on voltage, the precharge voltage supplied to the source line may be transferred to the channel layers, and thus the channel layers may be precharged. When negative voltage Vneg is applied to the source select lines SSL, the source select transistors may be turned off, but a leakage current may occur as a negative charge (an electron) moves due to the negative voltage, and the channel layer may be precharged while a positive charge is introduced to the channel layer due to the movement of the negative charge. Alternatively, the turn on voltage Von may be applied after the negative voltage Vneg is applied to the source select lines SSL in the precharge step. In remaining periods in which the number PL of program loops is equal to or greater than the reference number Cref, the precharge step may be performed in the method in which the turn on method and the GIDL method are mixed.

Figure 11:
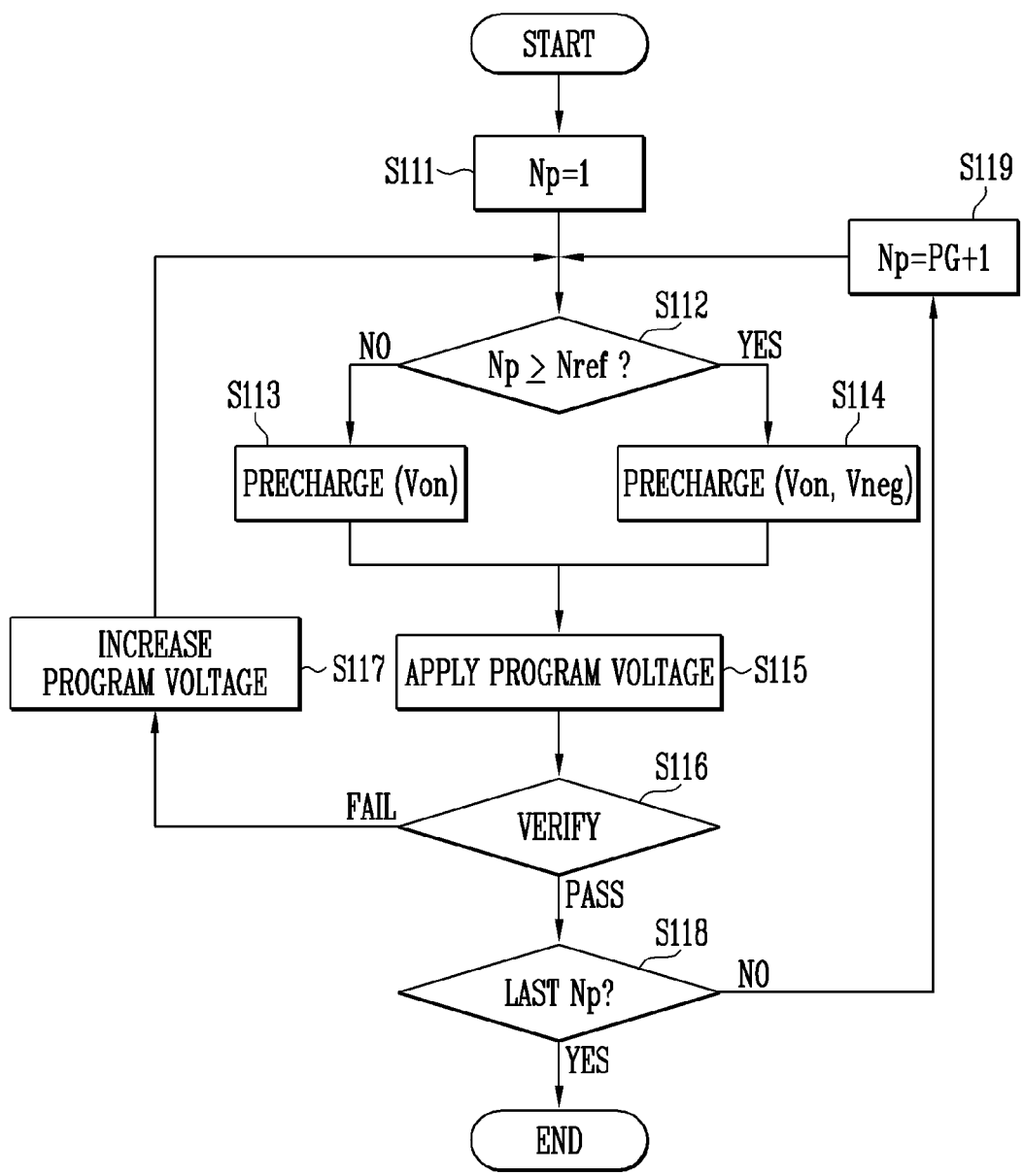
FIG. 11 is a flowchart illustrating a program operation according to a fourth embodiment of the present disclosure.

FIG. 11 is a flowchart illustrating a program operation according to a fourth embodiment of the present disclosure.

Referring to FIG. 11, in the fourth embodiment, the turn on method or the GIDL method may be selectively applied to the precharge period according to a selected page. The program operation according to the fourth embodiment is specifically described as follows.

When the program operation of the selected memory block is started, since a page selected first becomes a first page, a selected page number Np may be set to 1 (S111). The selected page number Np may be an order of a page selected during the program operation.

Subsequently, it may be determined whether the selected page number Np is equal to or greater than a reference page number Nref (S112). When the selected page number Np is less than the reference page number Nref (No), the precharge step may be performed only in the turn on method using the turn on voltage Von (S113). The reference page number Nref may be set within the number of pages included in the memory block, and may be set differently according to the memory device. For example, the reference page number Nref may be set in the test operation of the memory device. The test operation may be performed in the turn on method. For example, in the precharge period performed in the turn on method, a page number in which the potential of the channel layers is rapidly decreased or a time for the potential of the channel layers to be increased is longer than a reference time may be set as the reference page number N ref.

In step S112, when the selected page number Np is equal to or greater than the reference page number (Nref) (Yes), the precharge step in which the turn on method using the turn on voltage Von and the GIDL method using the negative voltage Vneg is mixed may be performed (S114).

After the precharge step is performed in step S113 or step S114, applying the program voltage to the selected word line may be performed (S115). When the program voltage is applied to the selected word line during a predetermined time, the verify step of determining the threshold voltage of the selected memory cells may be performed (S116).

When the verify step (S116) is failed, increasing the program voltage may be performed (S117), and the program operation of the selected page may be performed again. For example, steps S112 to S117 may be performed until the verify step S116 is passed.

When the verify step of the selected page (S116) is passed, determining whether the selected page number Np is a last page number (S118) may be performed. When the selected page number Np is not the last page number in the selected memory block (No), a next page may be selected. When the next page is selected, 1 is increased to the selected page number Np (S119).

Steps S112 to S119 may be performed in the above-described method. When the selected page number Np is the last in step S118 (Yes), the program operation of the selected memory block may be ended.

Figure 12:
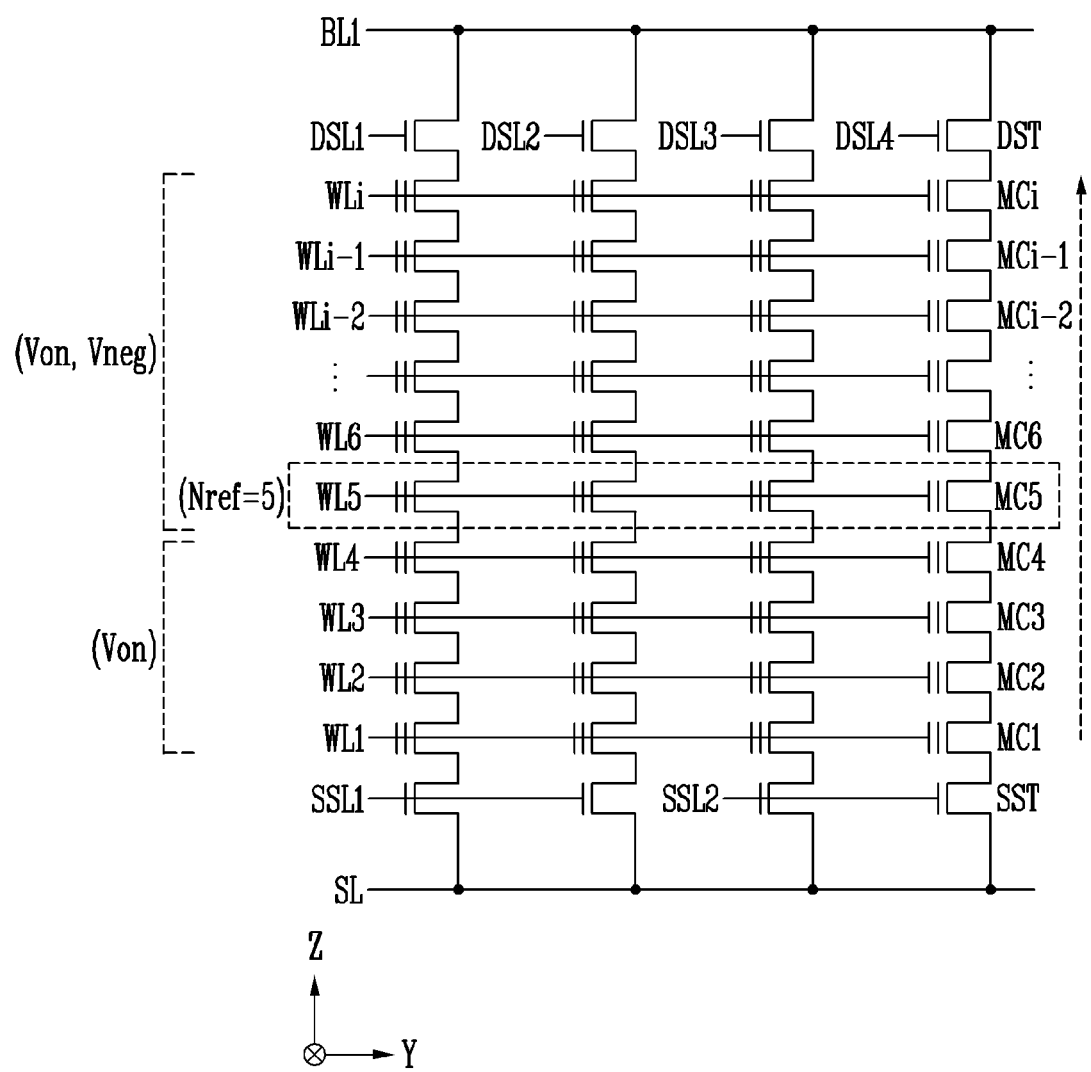
FIG. 12 is a circuit diagram illustrating the program operation according to the fourth embodiment of the present disclosure.

FIG. 12 is a circuit diagram illustrating the program operation according to the fourth embodiment of the present disclosure.

Referring to FIGS. 11 and 12, it is assumed that the program operation is performed from the source line SL to the first bit line BL1 and the reference page number Nref is 5.

In the selected memory block, a first page connected to the first word line WL1 may be programmed first. Since the page number of the first page is 1 and the reference page number Nref is 5, the precharge step may be performed in the turn on method using the turn on voltage Von. The precharge step may be performed in the turn on method on first to fourth pages of which the page number Np is lower than the reference page number Nref.

The precharge step in which the turn on method using the turn on voltage Von and the GIDL method using the negative voltage Vneg are mixed may be performed on fifth to i-th pages of which the page number Np is equal to or greater than the reference page number Nref.

Figure 13:
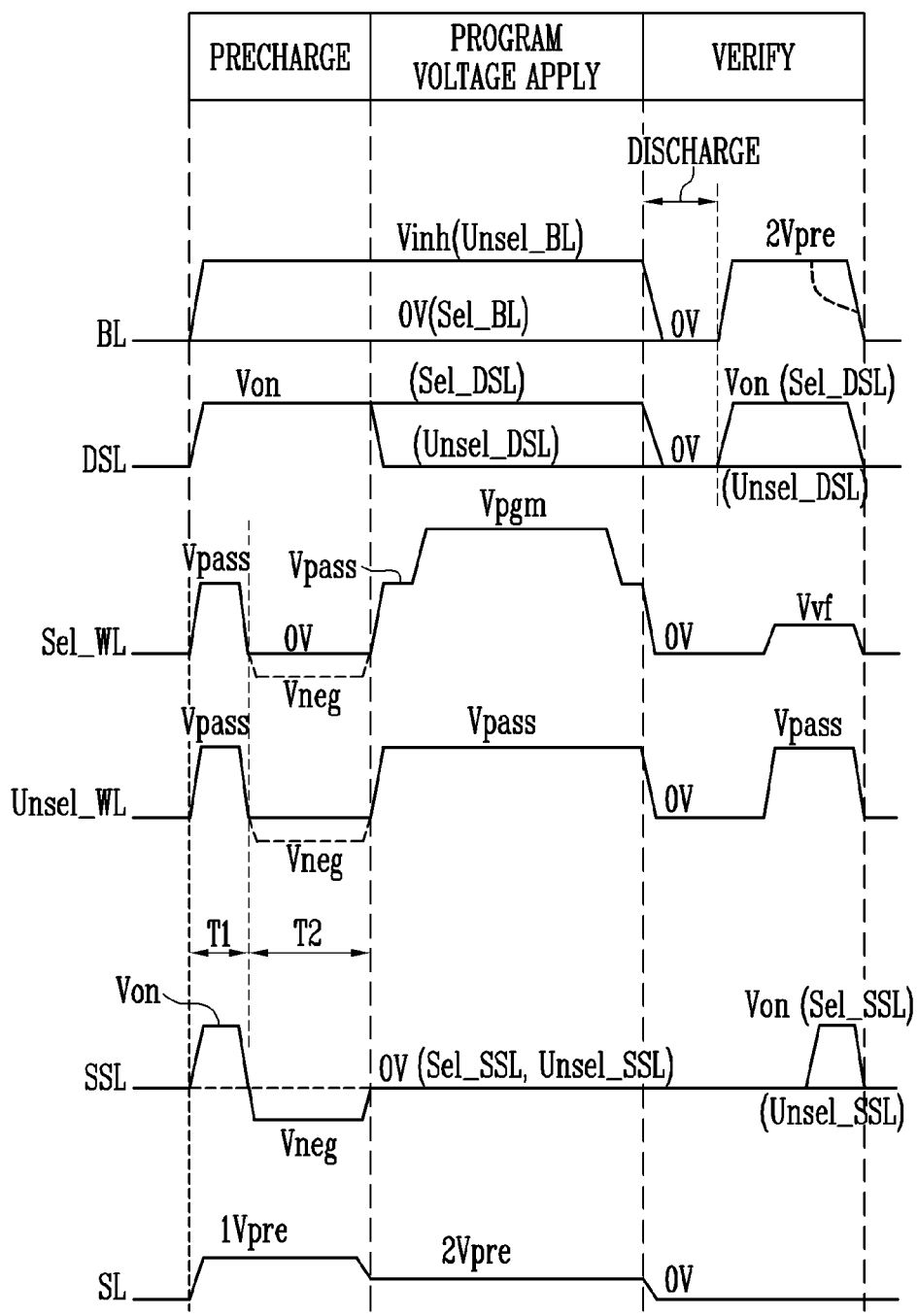
FIG. 13 is a diagram illustrating a program operation according to a fifth embodiment of the present disclosure.

FIG. 13 is a diagram illustrating a program operation according to a fifth embodiment of the present disclosure.

Referring to FIG. 13, in the fifth embodiment, the pass voltage Vpass may be applied to the selected word line Sel_WL and the unselected word lines Unsel_WL during a partial period of the precharge step. The program operation according to the fifth embodiment is specifically described as follows.

When the precharge step is started, 0V, which is the program allowable voltage may be applied to the selected bit lines Sel_BL, and the program inhibit voltage Vinh higher than 0V may be applied to the unselected bit lines Unsel_BL. In an embodiment, when the precharge step is started, 0V which is the program allowable voltage may be applied to selected bit lines Sel_BL, and a first precharge voltage 1Vpre higher than 0V or a second precharge voltage 2Vpre higher than 0V may be applied to unselected bit lines Unsel_BL. In order to transfer the voltages applied to the selected bit lines Sel_BL and the unselected bit lines Unsel_BL to the selected strings and the unselected strings, the turn on voltage Von may be applied to the drain select lines DSL. For example, the turn on voltage Von may be applied to the selected drain select line Sel_DSL and the unselected drain select lines Unsel_DSL. The turn on voltage Von may be set to a positive voltage higher than 0V.

In a state in which the first precharge voltage 1Vpre is applied to the source line SL, the turn on voltage Von may be applied to the source select lines SSL. For example, the turn on voltage Von may be applied to the selected source select line Sel_SSL and the unselected source select line Unsel_SSL. The turn on voltage Von may be applied to the source select lines SSL during the first time T1 in the precharge period. After the turn on voltage Von is applied during the first time T1 in the state in which the first precharge voltage 1Vpre is applied to the source line SL, the negative voltage Vneg lower than 0V may be applied to the source select lines SSL. That is, the turn on voltage Von applied to the source select lines SSL may be decreased to the negative voltage Vneg. The negative voltage Vneg may be applied to the source select lines SSL during the second time T2 longer than the first time T1. For example, the second time T2 may be set longer than the first time T1 at least twice. A method of applying a voltage to the source select lines SSL in the precharge period is more specifically described as follows.

When the turn on voltage Von is applied to the source select lines SSL during the first time T1, since the source select transistors are turned on by the turn on voltage Von, the first precharge voltage 1Vpre applied to the source line SL may be transferred to the channel layers. That is, electrons may move to the channel layers of the strings, and thus the potential of the channel may be increased. In the precharge period using the turn on voltage Von, the potential of the channel layers may be increased quickly, but as the number of programmed memory cells increases, the number of electrons that might not pass through the channel may increase, and thus the potential of the channel may be decreased as a distance from the source line SL increases.

After the turn on voltage Von is applied to the source select lines SSL during the first time T1, the negative voltage Vneg may be applied to the source select lines SSL. When the negative voltage Vneg is applied to the source select lines SSL, a leakage current may be generated in the source select transistors by the negative voltage Vneg, and holes generated by the leakage current may move to the channel layers. That is, the potential of the channel layers may be increased by the holes input to the channel layers. Since the holes are not affected by the threshold voltage of the memory cells, the potential of the channel layers may be increased to a constant level regardless of the number of programmed memory cells. However, a long time may be required for the holes to move to an end of the channel layer. Therefore, the precharge period using the turn on voltage Von may be performed during the first time T1, and the precharge period using the negative voltage Vneg may be performed during the second time T2 longer than the first time T1. The first time T1 may be set to a time shorter than a time set in the existing precharge period in which only the turn on voltage Von is used.

In order to improve the movement of the electrons moving in the channel layer, while the turn on voltage Von is applied to the source select lines SSL, the pass voltage Vpass may be applied to the selected word line Sel_WL and the unselected word lines Unsel_WL. In order to generate channel boosting in the program voltage apply step performed after the precharge step, while the negative voltage Vneg is applied to the source select lines SSL, a potential of the selected word line Sel_WL and the unselected word lines Unsel_WL is decreased to 0V or the negative voltage Vneg lower than 0V.

When the precharge step is ended, the program voltage apply step may be performed.

When the program voltage apply step is started, the 0V voltage may be applied to the unselected drain select lines Unsel_DSL, the selected source select line Sel_SSL, and the unselected source select line Unsel_SSL. When the 0V voltage is applied to the unselected drain select lines Unsel_DSL, the selected source select line Sel_SSL, and the unselected source select line Unsel_SSL, the select transistor connected to the unselected drain select lines Unsel_DSL, the selected source select line Sel_SSL, and the unselected source select line Unsel_SSL may be turned off. Therefore, the unselected strings may be floated.

The first precharge voltage 1Vpre applied to the source line SL may be decreased to the second precharge voltage 2Vpre, and the pass voltage Vpass may be applied to the selected word line Sel_WL and the unselected word lines Unsel_WL. When the 0V voltage or the negative voltage Vneg lower than 0V is applied to the selected word line Sel_WL and the unselected word lines Unsel_WL in the precharge period, which is a previous period, and then the pass voltage Vpass having a positive voltage is applied to the selected word line Sel_WL and the unselected word lines Unsel_WL in the program voltage apply period, channel boosting may occur in the unselected strings.

When the pass voltage Vpass is applied during a predetermined time, the program voltage Vpgm may be applied to the selected word line Sel_WL. When the program voltage Vpgm is applied to the selected word line Sel_WL, a voltage difference between the potential of the channel layers of the selected strings and the program voltage Vpgm increases, and thus the threshold voltage of the selected memory cells may be increased. At this time, since the unselected strings are floated, the voltage difference between the potential of the channel layers and the program voltage Vpgm is lower than that of the selected strings. Therefore, the threshold voltage of the unselected memory cells included in the unselected strings is not be increased. When the program voltage Vpgm is applied during a predetermined time, a potential of the selected word line Sel_WL may be decreased by applying the pass voltage Vpass to the selected word line Sel_WL.

When the program voltage apply step is ended, the verify step may be performed.

In the verify step, since the threshold voltage of the selected memory cells is required to be accurately sensed, the bit lines BL, the drain select lines DSL, the word lines Sel_WL and Unsel_WL, the source select lines SSL, and the source line SL may be discharged and initialized. When all lines are discharged, the second precharge voltage 2Vpre may be applied to the bit lines BL, and the turn on voltage Von may be applied to the selected drain select line Sel_DSL. The 0V voltage may be continuously applied to the unselected drain select lines Unsel_DSL.

Subsequently, the pass voltage Vpass may be applied to the unselected word lines Unsel_WL, and the verify voltage Vvf may be applied to the selected word line Sel_WL. When the verify voltage Vvf is applied to the selected word line Sel_WL, the source select transistors may be turned on by applying the turn on voltage Von to the selected source select line Sel_SSL. The 0V voltage may be continuously applied to the unselected source select line Unsel_SSL. When the selected source select transistors are turned on in a state in which the 0V voltage is applied to the source line SL, the voltage of the bit lines BL may be maintained as the second precharge voltage 2Vpre or may be decreased according to the threshold voltage of the memory cells. For example, since the threshold voltage of the memory cells on which the program is completed is higher than the verify voltage Vvf, the memory cells on which the program is completed are turned off. Since the bit lines BL and the source line SL are electrically blocked from each other by the turned-off memory cells, the potential of the bit lines BL may be maintained as the second precharge voltage 2Vpre. Since the threshold voltage of the memory cells on which the program is not completed is lower than the verify voltage Vvf, the memory cells which are not programmed are turned on. Since the bit lines BL and the source line SL are electrically connected to each other by the turned-on memory cells, the potential of the bit lines BL may be lower than the second precharge voltage 2Vpre.

Figure 14:
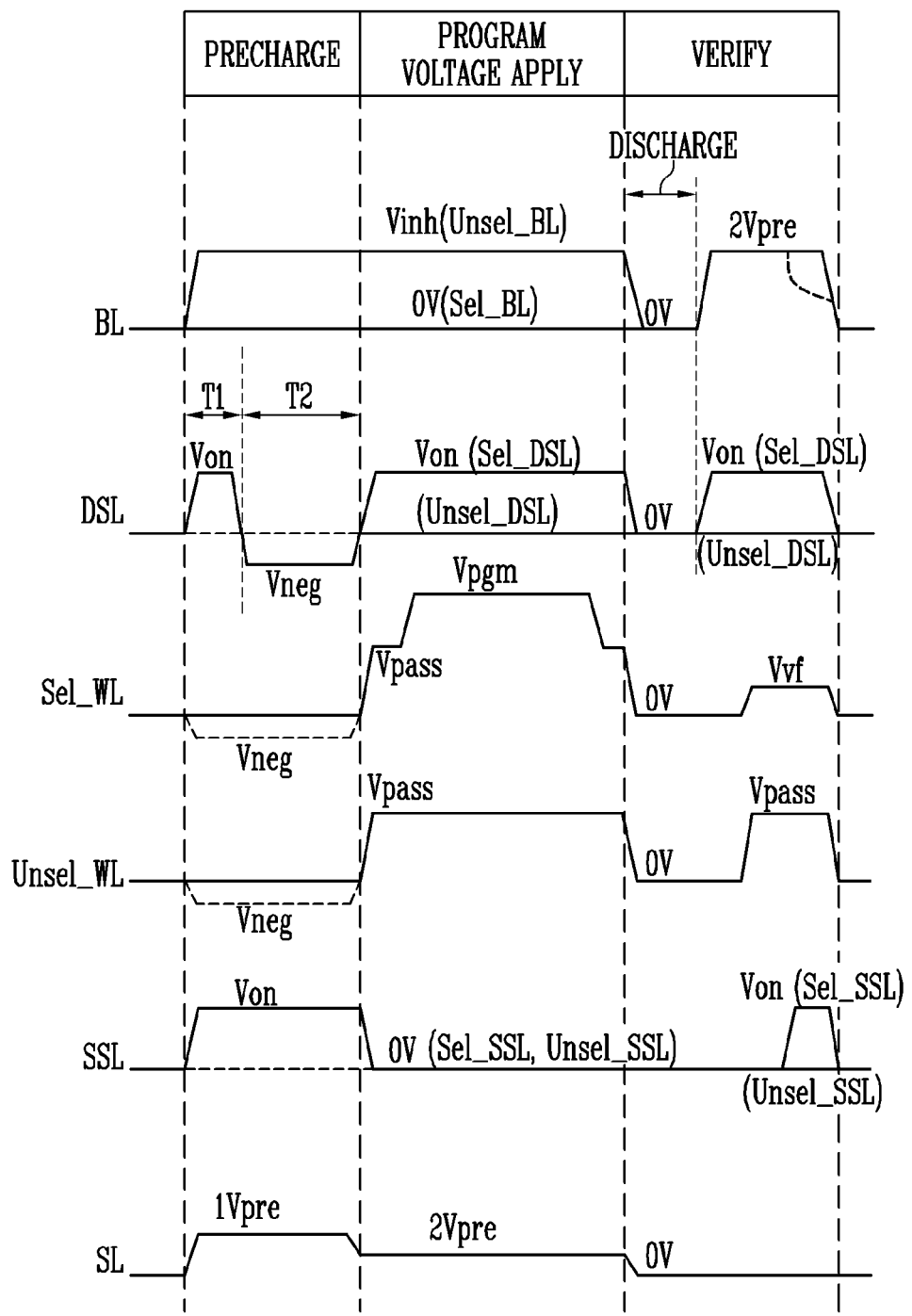
FIG. 14 is a diagram illustrating a program operation according to a sixth embodiment of the present disclosure.

FIG. 14 is a diagram illustrating a program operation according to a sixth embodiment of the present disclosure.

Referring to FIG. 14, in the precharge step of the program operation according to the sixth embodiment, the turn on voltage Von may be applied to the source select lines SSL, and the negative voltage Vneg may be applied to the drain select lines DSL after the turn on voltage Von is applied to the drain select lines DSL.

When the precharge step is started, 0V, which is the program allowable voltage may be applied to the selected bit lines Sel_BL, and the program inhibit voltage Vinh higher than 0V may be applied to the unselected bit lines Unsel_BL. In an embodiment, when the precharge step is started, 0V which is the program allowable voltage may be applied to selected bit lines Sel_BL, and a first precharge voltage 1Vpre higher than 0V or a second precharge voltage 2Vpre higher than 0V may be applied to unselected bit lines Unsel_BL. In order to transfer the voltages applied to the selected bit lines Sel_BL and the unselected bit lines Unsel_BL to the selected strings and the unselected strings, the turn on voltage Von may be applied to the drain select lines DSL. For example, the turn on voltage Von may be applied to the selected drain select line Sel_DSL and the unselected drain select lines Unsel_DSL. The turn on voltage Von may be set to a positive voltage higher than 0V.

The 0V voltage or the negative voltage Vneg lower than 0V may be applied to the selected word line Sel_WL and the unselected word lines Unsel_WL.

The first precharge voltage 1Vpre may be applied to the source line SL, and the turn on voltage Von may be applied to the source select lines SSL. The source select lines SSL may include the selected source select line Sel_SSL and the unselected source select line Unsel_SSL. The turn on voltage Von may be applied to the source select lines SSL during the precharge period.

After the turn on voltage Von is applied to the drain select lines DSL, the negative voltage Vneg may be applied. For example, the turn on voltage Von may be applied to the selected drain select line Sel_DSL and the unselected drain select lines Unsel_DSL during a first time T1. After the turn on voltage Von is applied during the first time T1, the negative voltage Vneg may be applied to the drain select lines DSL during the second time T2 longer than the first time T1.

That is, the turn on voltage Von applied to the drain select lines DSL may be decreased to the negative voltage Vneg. The negative voltage Vneg may be applied to the drain select lines DSL during the second time T2 longer than the first time T1. For example, the second time T2 may be set longer than the first time T1 at least twice.

When the precharge step is ended and the program voltage apply step is started, the potential of the source select lines SSL may be decreased to 0V. In the sixth embodiment, the program voltage apply step and the verify step are the same as the program voltage apply step and the verify step of the fifth embodiment, and thus a repetitive description is omitted.

Figure 15:
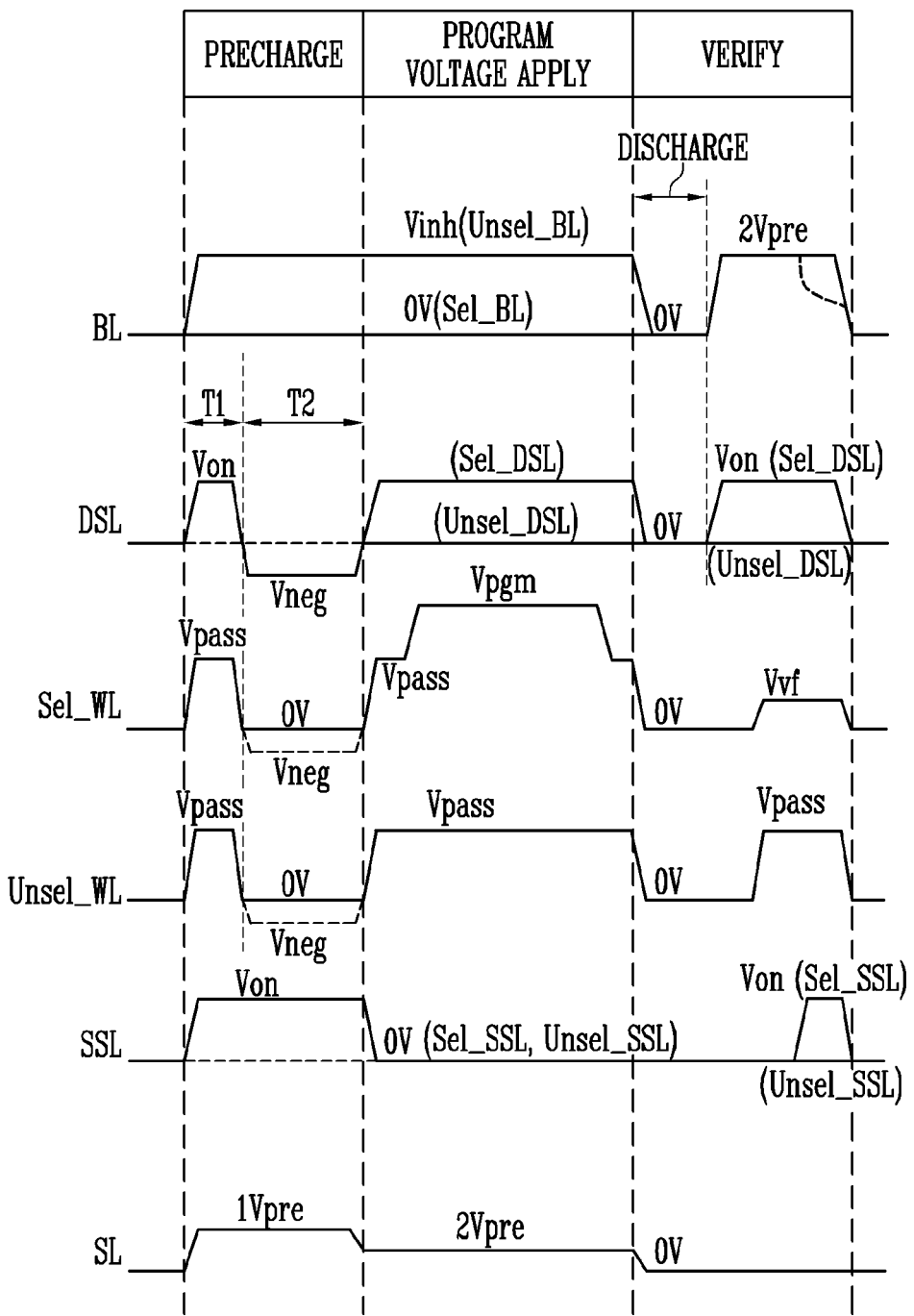
FIG. 15 is a diagram illustrating a program operation according to a seventh embodiment of the present disclosure.

FIG. 15 is a diagram illustrating a program operation according to a seventh embodiment of the present disclosure.

Referring to FIG. 15, in the precharge step of the program operation according to the seventh embodiment, the turn on voltage Von may be applied to the source select lines SSL, and the negative voltage Vneg may be applied to the drain select lines DSL after the turn on voltage Von is applied to the drain select lines DSL. While the turn on voltage Von is applied to the drain select lines DSL, the pass voltage Vpass may be applied to the selected word line Sel_WL and the unselected word lines Unsel_WL. In the precharge step, while the negative voltage Vneg is applied to the drain select lines DSL, the 0V voltage or the negative voltage Vneg lower than 0V may be applied to the selected word line Sel_WL and the unselected word lines Unsel_WL.

In the seventh embodiment, the program voltage apply step and the verify step are the same as the program voltage apply step and the verify step of the fifth embodiment, and thus a repetitive description is omitted.

Figure 16:
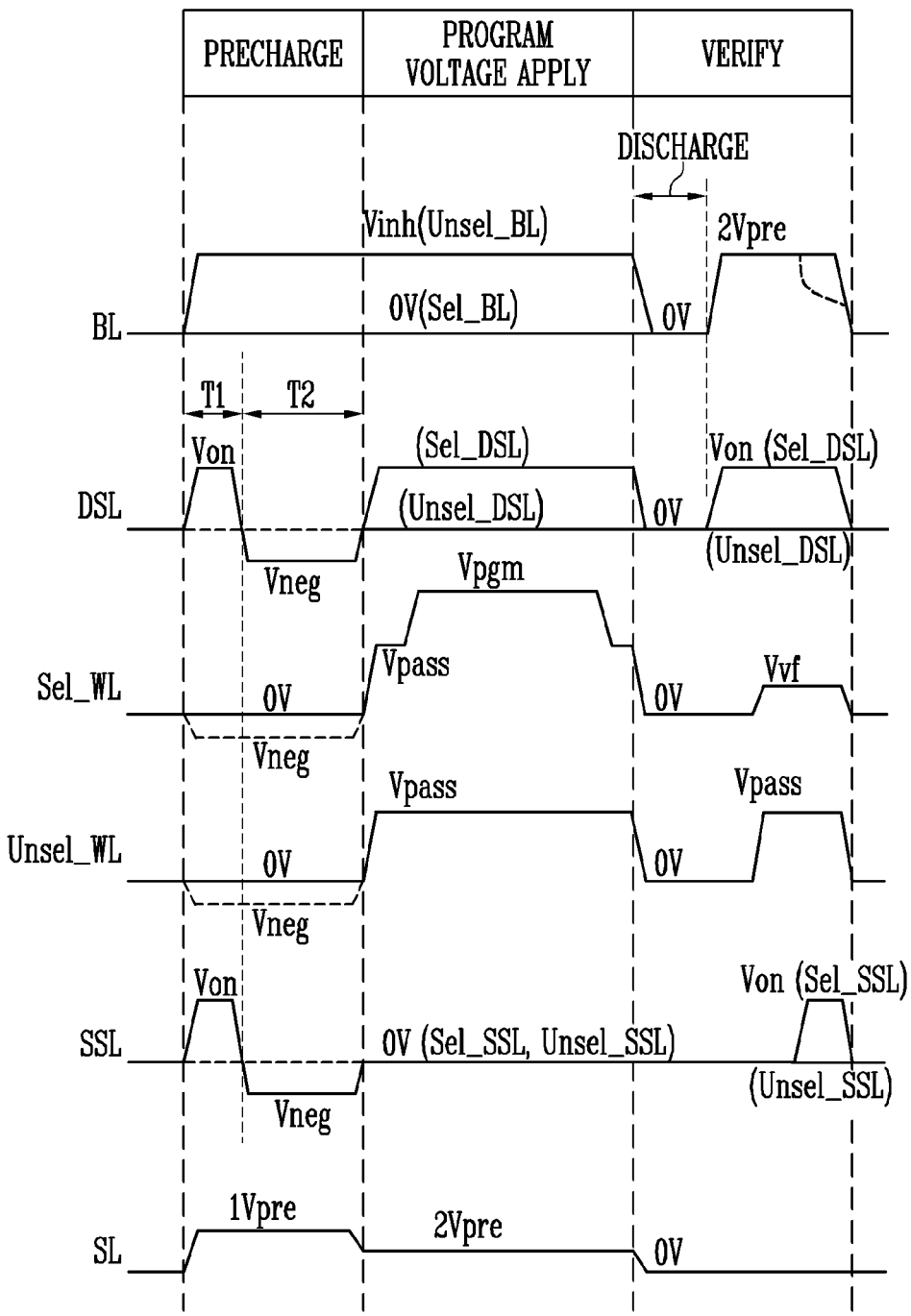
FIG. 16 is a diagram illustrating a program operation according to an eighth embodiment of the present disclosure.

FIG. 16 is a diagram illustrating a program operation according to an eighth embodiment of the present disclosure.

Referring to FIG. 16, in the precharge step of the program operation according to the eighth embodiment, after the turn on voltage Von is applied to the source select lines SSL and the drain select lines DSL, the negative voltage Vneg may be applied. The source select lines SSL include the selected source select line Sel_SSL and the unselected source select line Unsel_SSL. The drain select lines DSL include the selected drain select line Sel_DSL and the unselected drain select line Unsel_DSL.

In the precharge step, while the turn on voltage Von or the negative voltage Vneg is applied to the source select lines SSL and the drain select lines DSL, the 0V voltage or the negative voltage Vneg lower than 0V may be applied to the selected word line Sel_WL and the unselected word lines Unsel_WL.

In the eighth embodiment, the program voltage apply step and the verify step are the same as the program voltage apply step and the verify step of the fifth embodiment, and thus a repetitive description is omitted.

Figure 17:
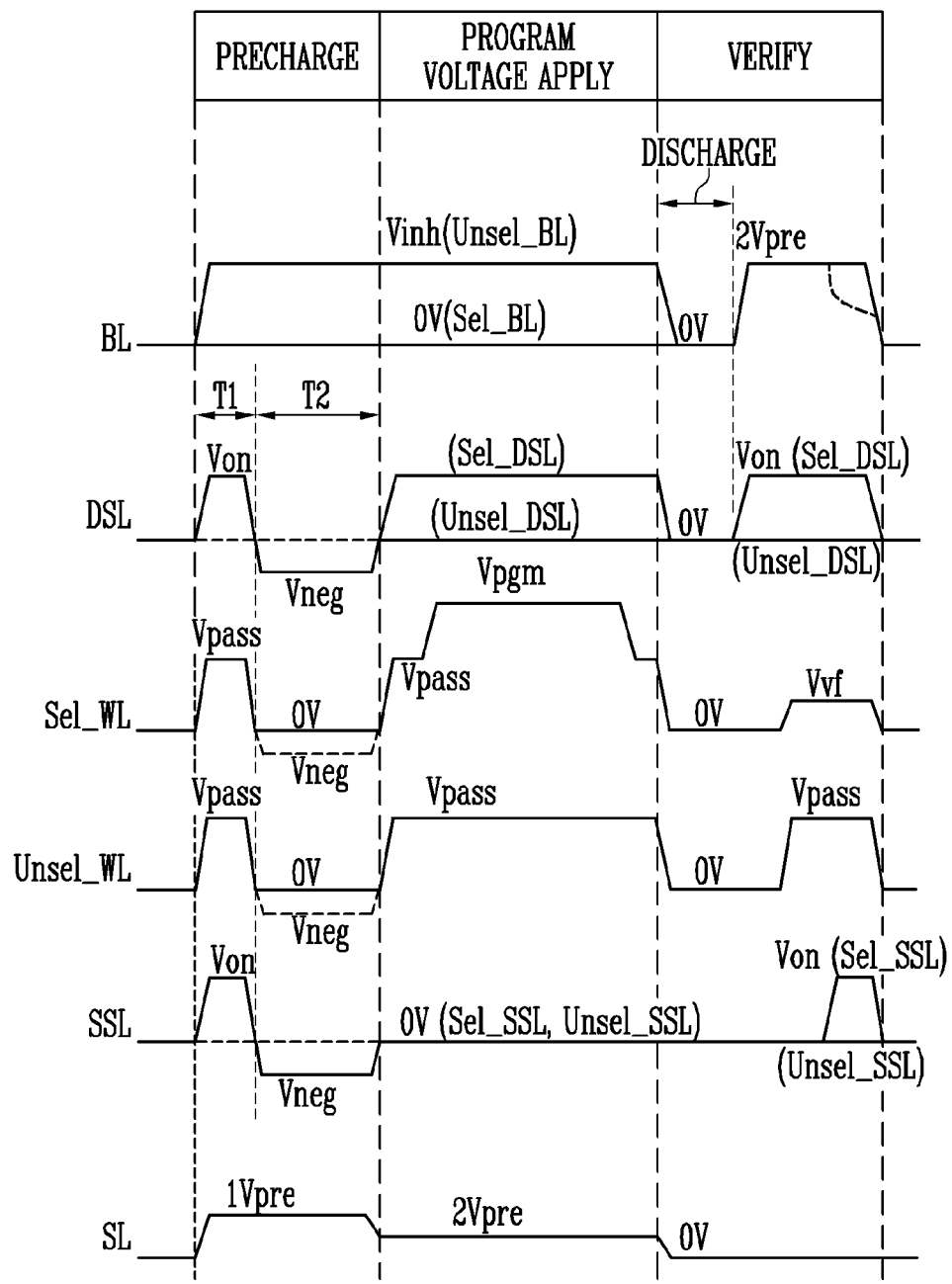
FIG. 17 is a diagram illustrating a program operation according to a ninth embodiment of the present disclosure.

FIG. 17 is a diagram illustrating a program operation according to a ninth embodiment of the present disclosure.

Referring to FIG. 17, in the precharge step of the program operation according to the ninth embodiment, after the turn on voltage Von is applied to the source select lines SSL and the drain select lines DSL, the negative voltage Vneg may be applied. The source select lines SSL include the selected source select line Sel_SSL and the unselected source select line Unsel_SSL. The drain select lines DSL include the selected drain select line Sel_DSL and the unselected drain select line Unsel_DSL.

In the precharge step, while the turn on voltage Von is applied to the source select lines SSL and the drain select lines DSL, the pass voltage Vpass may be applied to the selected word line Sel_WL and the unselected word lines Unsel_WL. In the precharge step, while the negative voltage Vneg is applied to the source select lines SSL and the drain select lines DSL, the 0V voltage or the negative voltage Vneg lower than 0V may be applied to the selected word line Sel_WL and the unselected word lines Unsel_WL.

Figure 18:
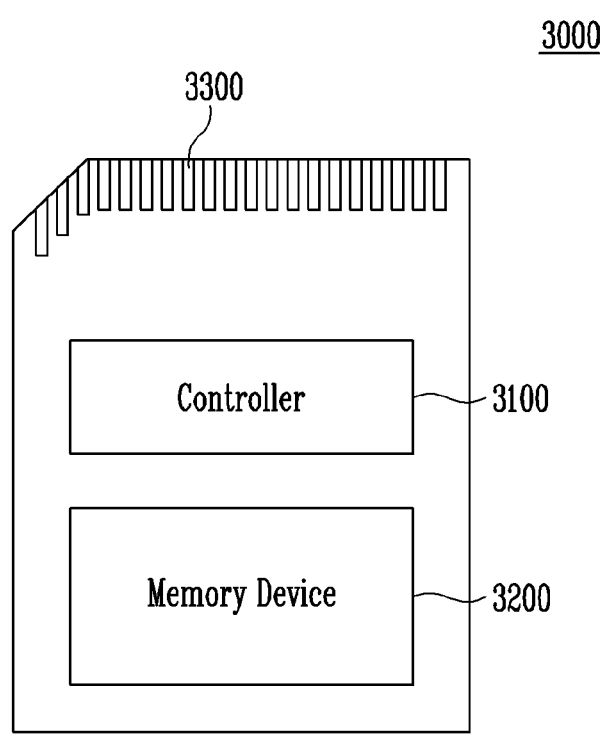
FIG. 18 is a diagram illustrating a memory card system to which a memory device of the present disclosure is applied.

FIG. 18 is a diagram illustrating a memory card system to which a memory device of the present disclosure is applied.

Referring to FIG. 18, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or to control a background operation. The controller 3100 is configured to provide an interface between the memory device 3200 and a host. The controller 3100 is configured to drive firmware for controlling the memory device 3200. For example, the controller 3100 may include components such as a random access memory (RAM), a processing unit, a host interface, a memory interface, and an error correction circuit.

The controller 3100 may communicate with an external device through the connector 3300. The controller 3100 may communicate with an external device (for example, the host) according to a specific communication standard. For example, the controller 3100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

The memory device 3200 may include a plurality of memory cells, and may be configured identically to the memory device 100 shown in FIG. 1. Therefore, the memory device 3200 may perform a program operation by selectively applying the turn on precharge method and the GIDL precharge method.

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 19:
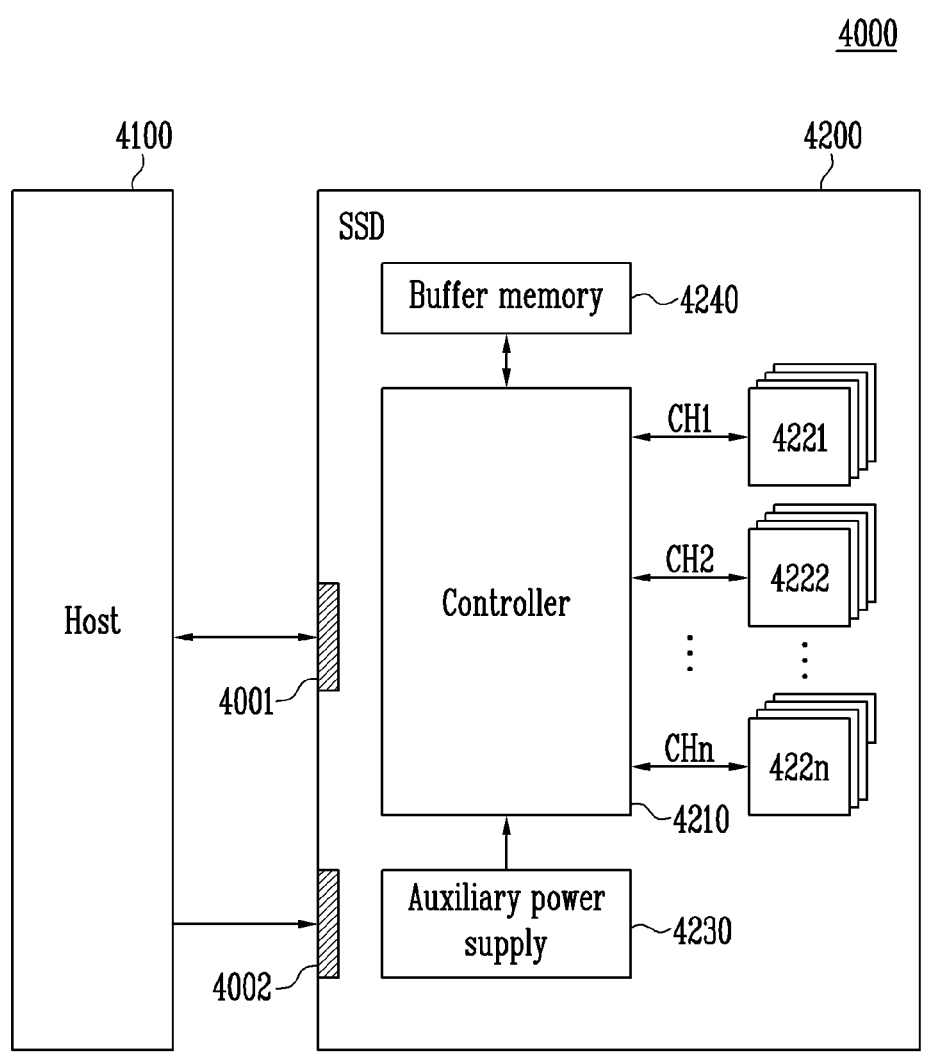
FIG. 19 is a diagram illustrating a solid state drive (SSD) system to which a memory device of the present disclosure is applied.

FIG. 19 is a diagram illustrating a solid state drive (SSD) system to which a memory device of the present disclosure is applied.

Referring to FIG. 19, the SSD system 4000 includes a host 4100 and an SSD 4200. The SSD 4200 exchanges a signal with the host 4100 through a signal connector 4001 and receives power through a power connector 4002. The SSD 4200 includes a controller 4210, a plurality of memory devices 4221 to 422n, an auxiliary power supply 4230, and a buffer memory 4240.

The controller 4210 may control the plurality of memory devices 4221 to 422n in response to the signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The plurality of memory devices 4221 to 422n may include a plurality of memory cells configured to store data. Each of the plurality of memory devices 4221 to 422n may be configured identically to the memory device 100 shown in FIG. 1. Therefore, each of the plurality of memory devices 4221 to 422n may perform a program operation by selectively applying the turn on precharge method and the GIDL precharge method. The plurality of memory devices 4221 to 422n may communicate with the controller 4210 through channels CH1 to CHn.

The auxiliary power supply 4230 is connected to the host 4100 through the power connector 4002. The auxiliary power supply 4230 may receive a power voltage from the host 4100 and charge the power voltage. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of memory devices 4221 to 422n, or may temporarily store meta data (for example, a mapping table) of the plurality of memory devices 4221 to 422n. The buffer memory 4240 may include a volatile memory such as a DRAM, an SDRAM, a DDR SDRAM, and an LPDDR SDRAM, or a nonvolatile memory such as an FRAM, a ReRAM, an STT-MRAM, and a PRAM.

What is claimed is:

1. A memory device comprising:
   a string including a first select transistor, memory cells, and a second select transistor connected between a source line and a bit line; and
   a peripheral circuit configured to supply a precharge voltage to the source line and selectively apply at least one of a turn on voltage and a negative voltage to a first select line connected to a gate of the first select transistor,
   wherein the peripheral circuit is configured to apply the precharge voltage to the source line, apply the turn on voltage to the first select line during a first time in which a channel layer of the string is precharged, and apply the negative voltage to the first select line during a second time in which the channel layer of the string is precharged, while precharging the channel layer of the string, and
   wherein the second time is set longer than the first time.

2. The memory device of claim 1, wherein the turn on voltage is set to a positive voltage higher than a threshold voltage of the memory cells.

3. The memory device of claim 1, wherein the peripheral circuit is configured to apply the turn on voltage to the first select line during the first time and then apply the negative voltage to the first select line during the second time.

4. The memory device of claim 1, wherein the peripheral circuit is configured to apply the negative voltage to the first select line during the second time and then apply the turn on voltage to the first select line during the first time.

5. The memory device of claim 1, wherein the second time is set to be, at least, twice as long as the first.

6. The memory device of claim 1, wherein the peripheral circuit is configured to apply the turn on voltage to a second select line connected to a gate of the second select transistor while the turn on voltage or the negative voltage is applied to the first select line.

7. The memory device of claim 1, wherein the peripheral circuit is configured to apply the turn on voltage or the negative voltage to a second select line connected to a gate of the second select transistor while the turn on voltage or the negative voltage is applied to the first select line.

8. The memory device of claim 1, wherein the peripheral circuit is configured to apply one of a voltage of 0V and a negative voltage lower than 0V to word lines connected to gates of the memory cells while the turn on voltage or the negative voltage is applied to the first select line.

9. The memory device of claim 8, wherein the negative voltage applied to the word lines is equal to the negative voltage applied to the first select line.

10. The memory device of claim 8, wherein the negative voltage applied to the word lines is set to a voltage between the negative voltage applied to the first select line and the voltage of 0V.

11. The memory device of claim 1, wherein the peripheral circuit is configured to apply a pass voltage to word lines connected to gates of the memory cells while the turn on voltage is applied to the first select line, and apply one of a 0V voltage and a negative voltage to the word lines while the negative voltage is applied to the first select line.

12. The memory device of claim 1, wherein the peripheral circuit is configured to apply the precharge voltage to the bit line while the channel layer is precharged, when the bit line is an unselected bit line.

13. The memory device of claim 1, wherein the peripheral circuit is configured to apply a 0V voltage to the bit line while the channel layer is precharged, when the bit line is a selected bit line.

14. The memory device of claim 1, wherein the peripheral circuit is configured to apply a 0V voltage to the first select line after the channel layer is precharged.

15. The memory device of claim 1, wherein the precharge voltage is generated as a positive voltage higher than 0V.

16. A method of operating a memory device, the method comprising:
    applying a turn on voltage to a first select line connected to a gate of a first select transistor during a first time, in order to precharge a string including the first select transistor, a second select transistor, and memory cells connected between the first and second select transistors;
    applying a negative voltage to the first select line during a second time in order to precharge the string; and
    applying a program voltage to a selected word line among word lines connected to gates of the memory cells when the string is precharged, and
    wherein the second time is set longer than the first time.

17. The method of claim 16, wherein the turn on voltage is set to a positive voltage higher than 0V so that electrons move to a channel of the string through the first select transistor.

18. The method of claim 16, wherein the negative voltage is set to a voltage lower than 0V so that holes move from the first select transistor to a channel of the string.

19. The method of claim 16, wherein applying the negative voltage is performed after applying the turn on voltage.

20. The method of claim 16, wherein applying the turn on voltage is performed after applying the negative voltage.

21. The method of claim 16, wherein the turn on voltage is applied to a second select line connected to a gate of the second select transistor while one of the turn on voltage and the negative voltage is applied to the first select line.

22. The method of claim 16, wherein one of the turn on voltage and the negative voltage is applied to a second select line connected to a gate of the second select transistor while one of the turn on voltage and the negative voltage is applied to the first select line.

23. The method of claim 16, wherein a 0V voltage or a negative voltage is applied to word lines connected to gates of the memory cells while the turn on voltage or the negative voltage is applied to the first select line.

24. The method of claim 16, wherein a pass voltage is applied to word lines connected to gates of the memory cells while the turn on voltage is applied to the first select line, and one of a 0V voltage and a negative voltage is applied to the word lines while the negative voltage is applied to the first select line.

25. A method of operating a memory device, the method comprising:
 comparing the number of program loops with a reference number;
 precharging a string by applying a turn on voltage to a first select line connected to a gate of a first select transistor among the first select transistor, a second select transistor, and memory cells connected between the first and second select transistors included in the string, when the number of program loops is less than the reference number; and
 precharging the string by applying the turn on voltage to the first select line during a first time and applying a negative voltage during a second time, when the number of program loops is equal to or greater than the reference number, and
 wherein the second time is set longer than the first time.

26. The method of claim 25, wherein when the number of program loops is equal to or greater than the reference number, after applying the turn on voltage to the first select line during the first time, the negative voltage is applied to the first select line during the second time.

27. The method of claim 25, wherein when the number of program loops is equal to or greater than the reference number, after applying the negative voltage to the first select line during the second time, the turn on voltage is applied to the first select line during the first time.

28. The method of claim 25, wherein the turn on voltage is set to a positive voltage higher than a threshold voltage of the memory cells.

29. A method of operating a memory device, the method comprising:
 comparing a selected page number with a reference page number;
 precharging a string by applying a turn on voltage to a first select line connected to a gate of a first select transistor among the first select transistor, a second select transistor, and memory cells connected between the first and second select transistors included in the string, when the selected page number is less than the reference page number; and
 precharging the string by applying the turn on voltage to the first select line during a first time and applying a negative voltage during a second time, when the selected page number is equal to or greater than the reference page number,
 wherein the second time is set longer than the first time.

30. The method of claim 29, wherein when the selected page number is equal to or greater than the reference page number, after applying the turn on voltage to the first select line during the first time, the negative voltage is applied to the first select line during the second time.

31. The method of claim 29, wherein when the selected page number is equal to or greater than the reference page number, after applying the negative voltage to the first select line during the second time, the turn on voltage is applied to the first select line during the first time.

* * * * *